United States Patent
Kuijk et al.

(10) Patent No.: US 7,633,354 B2
(45) Date of Patent: Dec. 15, 2009

(54) MULTISTAGE TUNING-TOLERANT EQUALIZER FILTER WITH IMPROVED DETECTION MECHANISMS FOR LOWER AND HIGHER FREQUENCY GAIN LOOPS

(75) Inventors: Maarten Kuijk, Berchem-Antwerpen (BE); Xavier Maillard, Pepingen (BE); Koen Van den Brande, Aartselaar (BE)

(73) Assignee: Vrije Universiteit Brussel, Brussels (BE)

( * ) Notice: Subject to any disclaimer, the term of this patent is extended or adjusted under 35 U.S.C. 154(b) by 83 days.

(21) Appl. No.: 11/991,640

(22) PCT Filed: Aug. 31, 2006

(86) PCT No.: PCT/BE2006/000095

§ 371 (c)(1),
(2), (4) Date: Mar. 7, 2008

(87) PCT Pub. No.: WO2007/028215

PCT Pub. Date: Mar. 15, 2007

(65) Prior Publication Data

US 2009/0128239 A1      May 21, 2009

(30) Foreign Application Priority Data

Sep. 9, 2005   (EP) .................................. 05447201

(51) Int. Cl.
*H03H 7/30*   (2006.01)
*H03F 3/45*   (2006.01)

(52) U.S. Cl. ..................................... 333/28 R; 375/229

(58) Field of Classification Search ................ 333/28 R, 333/18; 327/553; 375/229, 230, 232, 233
See application file for complete search history.

(56) References Cited

U.S. PATENT DOCUMENTS

2002/0034221 A1    3/2002   Webster

FOREIGN PATENT DOCUMENTS

| EP | 1 392 001 A1 | 2/2004 |
| EP | 1 447 950 A1 | 8/2004 |
| EP | 1 622 285 A2 | 2/2006 |

OTHER PUBLICATIONS

Jong-Sang Choui et al., "A CMOS 3.5gbps continuous-time adaptive cable equalizer with joint adaptation method of low-frequency gain and high frequency boosting", 2003 Symposium on VLSI Circuits, Digest of Technical Papers, Kyoto, Japan, Jun. 2003, pp. 103-106. (XP010651100).

*Primary Examiner*—Stephen E Jones
(74) *Attorney, Agent, or Firm*—Bacon & Thomas, PLLC

(57) ABSTRACT

The present invention provides an equalizer filter for compensating a received distorted signal for frequency dependent signal modifications introduced by a transmission channel, the received signal having an amplitude. The filter comprises at least one amplifying compensation stage having a gain and a saturation level, at least one limiting amplifier, and gain control means for controlling the gain of the at least one amplifying compensation stage, the gain control means comprising at least one comparator circuit comparing filtered input and output signals of the limiting amplifier, the at least one comparator circuit comprising a bias current source. The bias current source is adapted to deliver a variable current.

21 Claims, 19 Drawing Sheets

MULTISTAGE TUNING-TOLERANT EQUALIZER FILTER WITH IMPROVED DETECTION MECHANISMS FOR LOWER AND HIGHER FREQUENCY GAIN LOOPS

TECHNICAL FIELD OF THE INVENTION

The present invention relates to the field of data communication. More particularly, the present invention relates to devices and corresponding methods for multistage equalizer filtering in a line equalizer system, which restore the attenuated signals transmitted over a communication or transmission channel for a wide variety of communication or transmission channels with an acceptable amount of jitter. The present invention also relates to the use of the equaliser in communications system, e.g. in a modem.

BACKGROUND OF THE INVENTION

An equalizer system in general compensates frequency dependent losses that a signal experiences when passing through a transmission channel. Transmission channels include, but are not limited to, a wire, a pair of wires, an optical fibre, the reading and writing channels of a storage device like a hard-disc or optical disc, a wireless connection such as a point-to-point or diffuse infra-red or radio connection. A pair of wires includes a twisted pair, a twinax coax or a differential transmission line on a printed circuit board.

The compensation level of an equalizer system in general can be self-adaptive, fixed or programmable e.g. by a voltage or via a set of switches. A self-adaptive equalizer system continuously estimates the matching compensation level. It typically includes an adaptable filter, a control loop and an output reconstruction unit.

EP-1392001 describes how to organise a control loop in an equalizer system such that self-adaptation is achieved, independently from the transmit amplitude and the transmitted bit pattern. A feed-back control signal is generated from the equalised output of an equalizer filter. Depending on whether the output signal has been under- or over-compensated, the feed-back control signal increases or decreases, such that after a reasonable time the feed-back control signal converges to a value where matched compensation is reached. The control loop is formed by a first means for measuring a short-term-amplitude signal of the output signal, a second means for measuring a long-term-amplitude signal of the output signal and a comparator means for comparing the short-term-amplitude signal and the long-term-amplitude signal, and for determining the evolution of the feed-back control signal.

US-2002/0034221 discloses a communications receiver that has multiple stages each having a transfer function $1+K_i[f_i(j\omega)]$, wherein the $K_i$ vary with a sequential gain control methodology. This document thus teaches to compensate by making a sum per stage of the unity input signal linearly added to a function that has higher frequency gain. This known method makes multiple tuning signals in circuitry using many comparators and is relatively complex. It is not suited for low voltage operation nor for implementation on a small chip area using small transistors that have large input offset mismatches.

EP-05447018.2 describes a multistage equalizer filter for compensating a received distorted signal having an amplitude for frequency dependent signal modifications introduced by a transmission channel. The filter comprises at least one amplifying compensation stage having a gain and a saturation level, the gain being monotonically rising for at least a last decade in frequency below an upper data frequency of the received signal, and a gain control means for controlling the gain of the amplifying compensation stage such that the amplitude of the received signal amplified in the at least one amplifying compensation stage remains below the saturation level of the amplifying compensation stage. The gain may be regulated by separately regulating low frequency gain, mid-frequency gain and higher frequency gain for each of the at least one amplifying compensation stages.

SUMMARY OF THE INVENTION

It is an object of the present invention to provide apparatus and methods for an improved frequency gain loop detection mechanism in equalizer filters.

In a first aspect, the present invention provides an equalizer filter for compensating a received distorted signal for frequency dependent signal modifications introduced by a transmission channel or by any other means, the received signal having an amplitude. The filter comprises
- at least one amplifying compensation stage having a gain and a saturation level,
- at least one limiting amplifier, and
- gain control means for controlling the gain of the at least one amplifying compensation stage, the gain control means comprising at least one comparator circuit comparing filtered input and output signals of the limiting amplifier, the at least one comparator circuit comprising a bias current source.

According to the present invention, the bias current source is adapted to deliver a variable current.

The adaptation to the bias current source may include providing a current source delivering a current so low that the high frequency common mode rejection is deteriorated.

Alternatively, the adaptation to the current source may include the current source being provided with modulation means for modulating a current delivered by the bias current source. In one embodiment, the modulation means for modulating the current comprises a capacitive element placed in parallel over a fixed bias current source. In another embodiment, the modulation means for modulating the current comprises a modulation signal applied to a variable current source and for modulating this variable current source. In a third embodiment, when the gain control means comprise at least two comparator circuits comparing filtered input and output signals of the limiting amplifier, the at least two comparator circuits may comprise a common bias current source.

The adaptation to the current source is so as to provide a higher current level when differences between filtered input and output signals of the limiting amplifier are maximal.

The gain of the at least one amplifying compensation stage may be monotonically rising for at least a last decade in frequency below an upper data frequency of the received signal.

The gain control means may be adapted for controlling the gain of the amplifying compensation stage, such that the amplitude of the received signal amplified in the at least one amplifying compensation stage remains below the saturation level of the amplifying compensation stage.

According to embodiments of the present invention, the equalizer filter may be any of a dual loop equalizer filter or a triple loop equalizer filter.

The at least one comparator circuit may comprise two differential inputs. Each differential input may comprise two input nodes, wherein the comparator circuit is adapted to compare, from each differential input, signals on those input nodes which are highest in voltage. This is preferably done in an automatic way, for example by connecting each input node of a differential input to a gate of a transistor element. In this way, the transistor element connected to the highest voltage will conduct most current, and therefore this signal will be compared to the highest voltage signal on the other differential input.

In a second aspect, the present invention provides an equalizer system for compensating a received distorted signal for frequency dependent signal modifications introduced by a transmission channel or by any other means, said equalizer system comprising an equalizer filter according to the present invention.

In a third aspect, the present invention provides a method for compensating a distorted signal for frequency dependent signal modifications introduced by a transmission channel or by any other means, the signal having an amplitude. The method comprises receiving a distorted signal, compensating said distorted signal, and outputting a compensated signal at an output node of an equalizer filter. Compensating the distorted signal comprises providing a gain, amplifying the received signal in at least one amplifying compensation stage using the provided gain, and comparing differential outputs of a first signal on an output node of the last amplifying compensation stage and of a second signal on the output node of the equalizer filter, the comparing being adapted so that comparison performance is increased during periods when voltage levels of signals to be compared are the highest by increasing bias current of a comparator circuit. By comparison performance is meant any of: how often the comparison is carried out, the reliability of the comparison, the accuracy of the comparison, the ease of discrimination during the comparison.

The method may furthermore comprise, before comparing the differential outputs, filtering the first signal on the output node of the last amplifying compensation stage and the second signal on the output node of the equalizer filter.

The method may furthermore comprise amplifying and/or saturating the output of the last amplifying compensation stage.

The method may furthermore comprise generating a comparison signal from comparing the differential outputs, and using this comparison signal in adjusting at least one of the higher frequency gain, the mid-frequency gain or the low frequency gain of the at least one amplifying compensation stages.

The provided gain may be monotonically rising for at least a last decade in frequency below an upper data frequency of the received distorted signal. The gain may be adapted so as to keep the amplitude of the signal below a saturation level of at least one amplifying compensation stage.

The teachings of the present invention permit the design of improved equalizer filters and equalizer filtering methods for use in multistage equalizer systems which provide restoration of data signals transmitted over a communication channel showing high frequency attenuation behaviour. More in particular, structures and methods are provided that allow improved detection mechanisms for lower and higher frequency gain loops These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
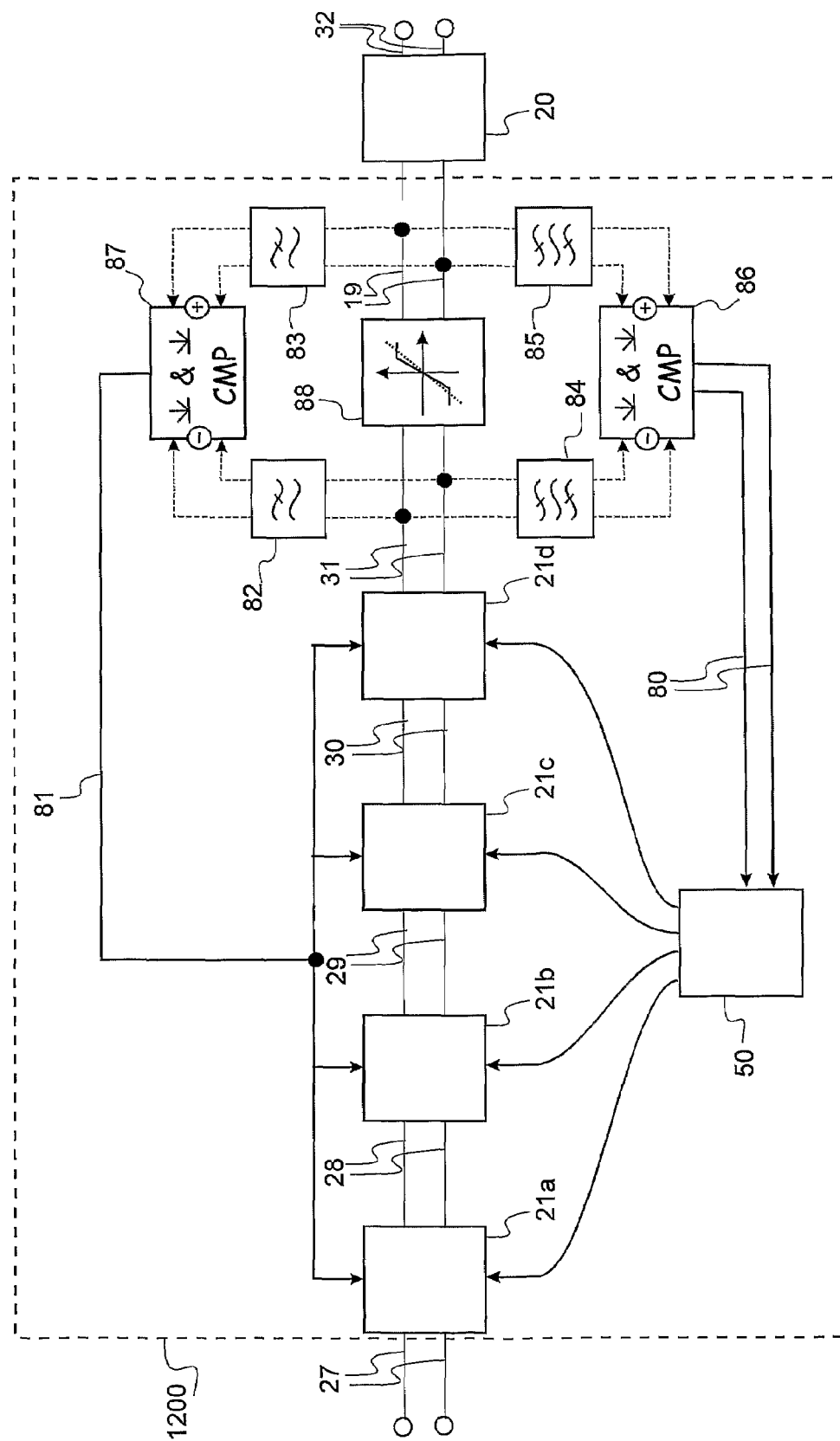
FIG. 1 shows a schematic representation of an adaptive equalizer filter having a second self-adapting compensation control loop which can be used with a comparator according to an embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter. Thus, the scope of the expression "a device comprising means A and B" should not be limited to devices consisting only of components A and B. It means that with respect to the present invention, the only relevant components of the device are A and B.

Similarly, it is to be noticed that the term "coupled" should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will be described by a detailed description of several embodiments of the invention. It is obvious that other embodiments of the invention can be configured by a person skilled in the art without departing form the true spirit or technical teaching of the invention, the invention therefore being limited only by the terms of the appended claims. It will be clear for a person skilled in the art that the present invention is also applicable to similar circuits that can be configured in any transistor technology, including for example, but not limited thereto, CMOS, BICMOS and SiGe BICMOS. It will furthermore be clear that similar merits of the invention can be obtained when single-ended signals are implemented as differential signals and vice-versa, without departing from the true spirit of the invention.

FIG. 1 shows a schematic representation of a dual loop auto adaptive equalizer filter 1200. The filter may be used in a suitable electronic device, e.g. in a modem or receiver of a telecommunications device.

The equalizer filter 1200 shows a cascade of amplifying compensation stages 21a, 21b, 21c, 21d of a multi-stage equalizer system. The compensation stages 21a, 21b, 21c, 21d are coupled in series in cascade. The number of amplifying compensating gain stages 21a ... 21d shown in FIG. 1 is four, but can be less or more in reality. The number of amplifying compensation stages 21a, 21b, 21c, 21d depends on the wanted or required total compensation to be reached, and can differ from application to application. This number also depends on the used circuit integration technology. Therefore, although—by way of example—an equalizer filter 1200 is shown having four amplifying compensation stages 21a, 21b, 21c, 21d, the invention is not limited thereto.

The amplifying compensation stages 21a, 21b, 21c, 21d can be any type of suitable compensation stages, i.e. compensation stages with a fixed higher frequency gain compensation, programmable compensation stages, tunable compensation stages, .... Some explicit—non-limiting—examples will be given in more detail further in the description. Amplifying compensation stages 21a, 21b, 21c, 21d typically show a frequency gain which increases with increasing frequency, further called higher frequency gain, at least to an upper data frequency. The upper data frequency is at least half the data bandwidth or communication bit rate. For example, a 1.5 Gbps data bandwidth has an upper data frequency $F_u$ of 750 MHz or higher. The frequency gain can e.g. be between 1 dB and 30 dB per stage, preferably between 3 dB and 15 dB per stage, for a data rate of 1.5 Gbps. For low-voltage equalizer filters, it is recommended in PCT/EP04/001414 to limit the frequency gain or compensation level per stage to a lower value, e.g. to 5 dB.

The data rate of the input signal that can be received by an equalizer filter 1200 may typically be within the range 1 Mbps and 100 Gbps. Typically, a signal is supplied to the input node 27 of equalizer filter 1200 that has more or less suffered from frequency attenuation from a transmission channel with limited bandwidth characteristics, whereby higher frequencies are more attenuated than lower frequencies. The input signal is inputted in the equalizer filter 1200 at input node 27, which serves as the differential input node of the amplifying compensation stage 21a.

In order to be able to illustrate the compensation behaviour of the equalizer filter 1200 and the effect of the different compensation stages 21a, 21b, 21c, 21d, intermediate nodes 28, 29, 30, 31 and 19 are defined between compensation stages 21a and 21b, compensation stages 21b and 21c, compensation stages 21c and 21d, compensation stage 21d and limiting amplifier 88 and limiting amplifier 88 and output circuit 20, respectively. Output circuit 20 has an output node 32 and can include any useful stage following an equalizing filter in an equalizer system, including but not limited to a bit-slicer, a limiting amplifier, a DC-restoring system or a Schmitt-trigger, and possibly an output driver stage, all known by a person skilled in the art. The output circuit 20 together with the equalizer filter 1200 are part of an equalizer system. This output circuit 20 may be provided to compensate amplitude variations obtained by equalizing, at the expense of very little or no additional jitter. The equalizer filter 1200 may be adjusted to achieve allowed overcompensation with a limited amount of jitter, as discussed in EP-05447018.2, although the present invention is not limited thereto. The amount of allowed overcompensation may reach up to 5 dB, preferably up to 10 dB, more preferably up to 15 dB, and most preferred up to 30 dB, keeping jitter below 0.3 UI. The units of jitter measurement are picoseconds peak-to-peak (ps p-p), rms, and percent of the unit interval (UI). The p-p measurement states the maximum to minimum amount of time deviation, usually in picoseconds. A jitter measurement can also be the p-p average over a 30 or 60 s duration, or over, say, 10,000 cycles. Rms jitter is one standard deviation ($\sigma$) of the p-p jitter value where the distribution is Gaussian in nature. Jitter also is expressed as a percentage of time compared to the UI or one bit time. For example, one UI at 10 Gbits/s is 100 ps. A jitter specification might be 40 mUI, meaning 4 ps. For equalizer circuits a total jitter level of 0.3 UI is generally accepted, however this can be somewhat more or less, depending on the quality of the attached resampling system and on the expected jitter level due to other sources of jitter, like cross-talk or ground bounce effects.

The equalizer filter 1200 comprises a limiting amplifier 88 for amplifying and/or digitizing the output 31 of the last amplifying compensation stage 21d. This limiting amplifier 88 has itself a fixed maximum output amplitude, e.g. 750 mV.

The equalizer filter 1200 comprises a first feed-back loop comprising two low-pass filters 82 and 83 for filtering the input 31 and the output 19 of the limiting amplifier 88 respectively. The filtering characteristics of the low-pass filters 82 and 83 may be as shown by curve 149 in FIG. 2.

The equalizer filter 1200 also comprises a second feed-back loop for self adaptation. This second feed-back loop comprises a feed-back circuit 50 and a feed-back connection 80 between an intermediate node 28, 29, 30, 31 positioned after an amplification compensation stage, preferably after the last amplification compensation stage 21d, and the feed-back circuit 50. The feed-back circuit 50 preferably sequentially turns on amplifying compensation stages 21a to 21d until typically matched compensation is reached. For matched compensation typically an error margin of about 1 to 2 dB, depending on the level of compensation and compensation conditions, is allowed. The precision with which the level of compensation has to be determined can be relaxed considerably in this case of self-adaptation. The amplifying compensation stages 21a, 21b, 21c, 21d that can be used for this embodiment can e.g. be the amplifying compensation stage of FIG. 3 or 4 but they are not limited thereto. The amplifying compensation stages need to be always increasing for at least the last decade in frequency below an upper data frequency of the signal. Patent applications EP-02447160 and PCT/EP04/001414, co-pending herewith, describe how to organise the control loop such that matched self-adaptation is achieved possibly with multiple stages, and possibly at lower voltage as well. However, when overcompensation of e.g. 8 dB can be tolerated by the equalizer filter 1200, instead of always regulating close to ideal compensation, the self adaptive loop can be designed such that e.g. 4 dB of overcompensation is envisaged as the regulating target. The realized compensation then has a tolerance of reaching its target compensation value by −4 dB to +4 dB. This considerably enhances reliability of adaptive equalizer filters, and also improves the yield with which such circuits can be made. Depending on the used technology, data rate and acceptable jitter level for the given application, using the findings of the present invention will allow an overcompensation between at least 3 dB and maximum 20 dB. A 10 dB allowable overcompensation should be within reach for most given realistic situations.

In the second feedback loop, two bandpass filters 84 and 85 filter the input 31 and output 19 of the limiting amplifier 88 respectively. The filtering characteristics of the band-pass filters 84 and 85 may be as shown by curve 148 in FIG. 2.

The differential outputs of low-pass filters 82 and 83 are compared by a differential rectifying comparator 87 according to an embodiment of the present invention, thus generating a voltage on node 81. Node 81 drives gain control signals on gain input terminals of all amplifying compensation stages 21a, 21b, 21c, 21d. When the low frequency components in the signal on node 31 (that is the input to the limiting amplifier 88) are too low with respect to the signal that comes out of the limiting amplifier 88 on node 19, then the rectifying comparator 87 will increase the voltage on node 81 such that the gain at lower frequency will be raised. Conversely, when the low frequency components in the signal on node 31 are too high with respect to the signal that comes out of the limiting amplifier 88 on node 19, then the rectifying comparator 87 will decrease the voltage on node 81 such that the gain at lower frequency will be decreased The differential outputs of band-pass filters 84 and 85 are compared by a rectifying comparator 86 according to an embodiment of the present invention, thus generating a signal 80 that communicates to feed-back circuit 50 to increase or decrease the higher frequency gain. Feed-back circuit 50 drives the higher frequency gain inputs of all amplifying compensation stages 21a, 21b, 21c, 21d. When the high frequency components in the signal on node 31 (that is the input to the limiting amplifier 88) are too low with respect to the signal that comes out of the limiting amplifier 88 on node 19, then the rectifying comparator 86 will communicate to feed-back circuit 50 that the higher frequency gain has to be raised. Conversely, when the high frequency components in the signal on node 31 are too low with respect to the signal that comes out of the limiting amplifier 88 on node 19, then the rectifying comparator 86 will communicate to feed-back circuit 50 that the higher frequency gain has to be decreased.

Feed-back circuit 50 is a circuit that has several outputs determining which of the connected amplifying compensation stages 21a, 21b, 21c, 21d will have its higher frequency gain function circuit 850 (see FIG. 3) turned ON or OFF and of which of those amplifying compensation stages 21a, 21b, 21c, 21d the higher frequency gain function circuit 850 is in a state in between ON and OFF. An example of such circuit is in more detail described in co-pending patent application PCT/EP04/001414. The simplest and most effective version is the one whereby the stages get consecutively turned ON, one after the other for an increasing demand of higher frequency gain amplification. In that way, the data signal that is travelling through the set of cascaded stages, will encounter first the stages that are having their higher frequency gain functions 850 turned ON, then that one stage that is possibly having its higher frequency gain function 850 in an intermediate state, and then the remainder of the stages having their higher frequency gain functions 850 in the OFF state. From a signal to noise perspective it is always better in an amplification chain to start with as much amplification as possible. Therefore this is also the preferred choice.

The position of the −3 dB point of the low pass filters 82, 83 is chosen such that the signal that comes out of these filters is mostly affected by frequency components that get tuned by the lower frequency gain control signal, and less by frequencies of which the gain is affected by the higher frequency gain control signal. Similarly the pass band of filters 84 and 85 is chosen such that the signal that comes out of these filters is mostly affected by frequency components that get tuned by the higher frequency gain control signals, and less by frequencies of which the gain is affected by the lower frequency gain control signal. In that way, both loops can more or less independently converge to their end value. There is some interference between both regulation loops, however, this will not lead to instability if done properly (like is proposed here), and at the end, the loops converge to an end value. At convergence point, the resultant gain curve should more or less fit the desired gain curve being the complement of the channel loss that was to be compensated. Indeed, by assuring that the signal components at lower and at higher frequencies become matching, the curves can only differ in the mid-frequencies. However by making curves 116 and 114 (FIG. 5) substantially match by construction over the whole frequency range for a given value of the gain input, the difference at the mid-frequencies will be relatively small, when at convergence point the gain input may end up to be slightly different.

In the above, it is proposed to use low-pass filters for filters 82 and 83, however, in an alternative embodiment it is as well possible to use a band-pass filter, e.g. with an extra −3 dB point at 1 MHz. Similarly, for the filters 84 and 85 it is proposed in the above to use band pass filters, however high-pass filters will work as well, e.g. with a −3 dB point at 300 MHz.

In the following description more explicit examples of amplifying compensation stages 21a, 21b, 21c, 21d that can be used in the different embodiments of the present invention are given. It will be obvious for the person skilled in the art that other amplifying compensation stages 21a, 21b, 21c, 21d, having a different electronic circuit, can be used or that, for a given circuit, the values of the different components used can differ.

In the following explanation, and referring to FIG. 3, an amplifying compensation stage 800 is shown. The amplifying compensation stage 800 receives an input signal between differential input data nodes 804, and generates an output signal between differential output data nodes 806. The transistors M3 and M1 function as source followers that are biased by the transistors M4 and M2, which e.g. can be transistors, mirroring the current I1.

The amplifying compensation stage 800 comprises a gain input terminal 802 to which a gain control signal may be applied. In the example illustrated in FIG. 3, the first gain input terminal 802 is connected to a lower frequency gain function circuit 810, while a second gain input terminal 813 is connected to the higher frequency gain function circuit 850. A signal applied to input node 804 will be amplified and output at output node 806, whereby a frequency dependent gain is applied.

When a first gain control signal is applied to the first gain input terminal 802, the lower frequency gain of the amplifying compensation stage 800 may be adjusted. This may be done by applying the gain control signal to a controllable analog switch so as to regulate it, the controllable analog switch e.g. being a transistor M8. The controllable analog switch is a switch with a continuously or quasi-continuously changing value between 0 and 1 (resp. fully open and fully closed). The controllable analog switch thus may be partially open/partially closed, and therefore is called an analog switch, contrary to a digital switch, which would be either in an open state or in a closed state. If the controllable analog switch is coupled in parallel over a resistance with value R21, which resistance is coupled in series with two other resistances R20 and R22, the value of the controllable analog switch brings the total series resistance of lower frequency gain function 810 from a value of (R20+R21+R22) when the switch M8 is fully open, down to a value of approximately (R20+R22) when the switch M8 is fully closed. When the voltage on the first gain input terminal 802 is 0V, the switch, e.g. transistor M8, is open, and for increasing voltages up to the power supply voltage, e.g. 1.8 V, it progressively, i.e. continuously or quasi-continuously, fully closes. In this way, the resistance of the lower frequency gain function circuit 810 can be regulated. This determines the gain at lower frequency of the stage 800.

The values of R20, R21 and R22 may be chosen such that the gain at lower frequencies can be regulated in a range of e.g. −1.5 to +1.5 dB. Depending on the specific application needs, this range may be chosen differently. It is also possible to leave out the resistors R20, R21 and R22, and directly connect the continuously varying analog switch, e.g. transistor M8, between nodes 808 and 809. This would cost less substrate area, e.g. Si area, for implementing the resistors, but it is at the expense of linearity and it lowers regulating stability and can give start-up difficulties under certain circumstances.

The compensation stage 800 comprises a programmable and/or tunable higher frequency gain function circuit 850 for delivering the increasing gain at higher frequencies. The gain setting circuit 850 may for example comprise a parallel connection of, on the one hand, a first capacitive element (capacitor C1) in series with a first resistive element (series connection of resistor R3 and resistor R5) and, on the other hand a second capacitive element (capacitor C2). By way of example, two resistive elements R3 and R5 are shown in FIG. 3 for symmetry reasons, but the invention also operates if only a single resistive element is used. The group of circuit elements 301 form a decreasing impedance for higher frequency, increasing the gain of the stage at higher frequency. The elements R3, R5 and C1 form a zero-pole pair in the filtering behaviour and the capacitor C2 forms a zero in the transfer characteristics. The amplifying compensation stage 800 provides a programmable and/or tuneable higher frequency gain function circuit by providing an additional switching element. By turning on a switching element in series with the higher frequency gain function circuit 850, e.g. transistor M9, the circuit elements grouped as gain function circuit 850, become connected between the sources of transistor M1 and transistor M3, leading to higher frequency gain at the output node 806. When the switch coupled to the higher frequency gain function circuit 850 is open, e.g. transistor M9 is not conducting, by driving it by means of a second gain control signal on second gain input terminal 813, the higher frequency gain disappears. Although transistor M9 is called a switch, it may be driven with intermediate voltage values, generating a switch that can be partially open/closed as well, thus forming what is called above an analog switch. At least input node 804, output node 806, internal nodes 808 and 809 are considered to carry data-signals.

By way of example, a set of explicit values for the electronic components are given in Table 1. Other programmable/tuneable amplifying compensation stages are known by the person skilled in the art and can be considered as well for implementing the present invention.

TABLE 1

| Component | Value | Component | Value |
| --- | --- | --- | --- |
| resistor R1 | 1.1 kΩ | Transistor M1 | 10 um/0.18 um |
| resistor R20/R22 | 500 Ω | Transistor M2 | 40 um/0.35 um |
| resistor R21 | 1.7 kΩ | Transistor M3 | 10 um/0.18 um |
| resistor R3 | 8 kΩ | Transistor M4 | 40 um/0.18 um |
| resistor R5 | 8 kΩ | Transistor M6 | 40 um/0.18 um |
| Capacitor C1 | 280 fF | Transistor M8 | 2.5 um/0.18 um |
| Capacitor C2 | 100 fF | Transistor M9 | 2.5 um/0.18 um |

Figure 3:
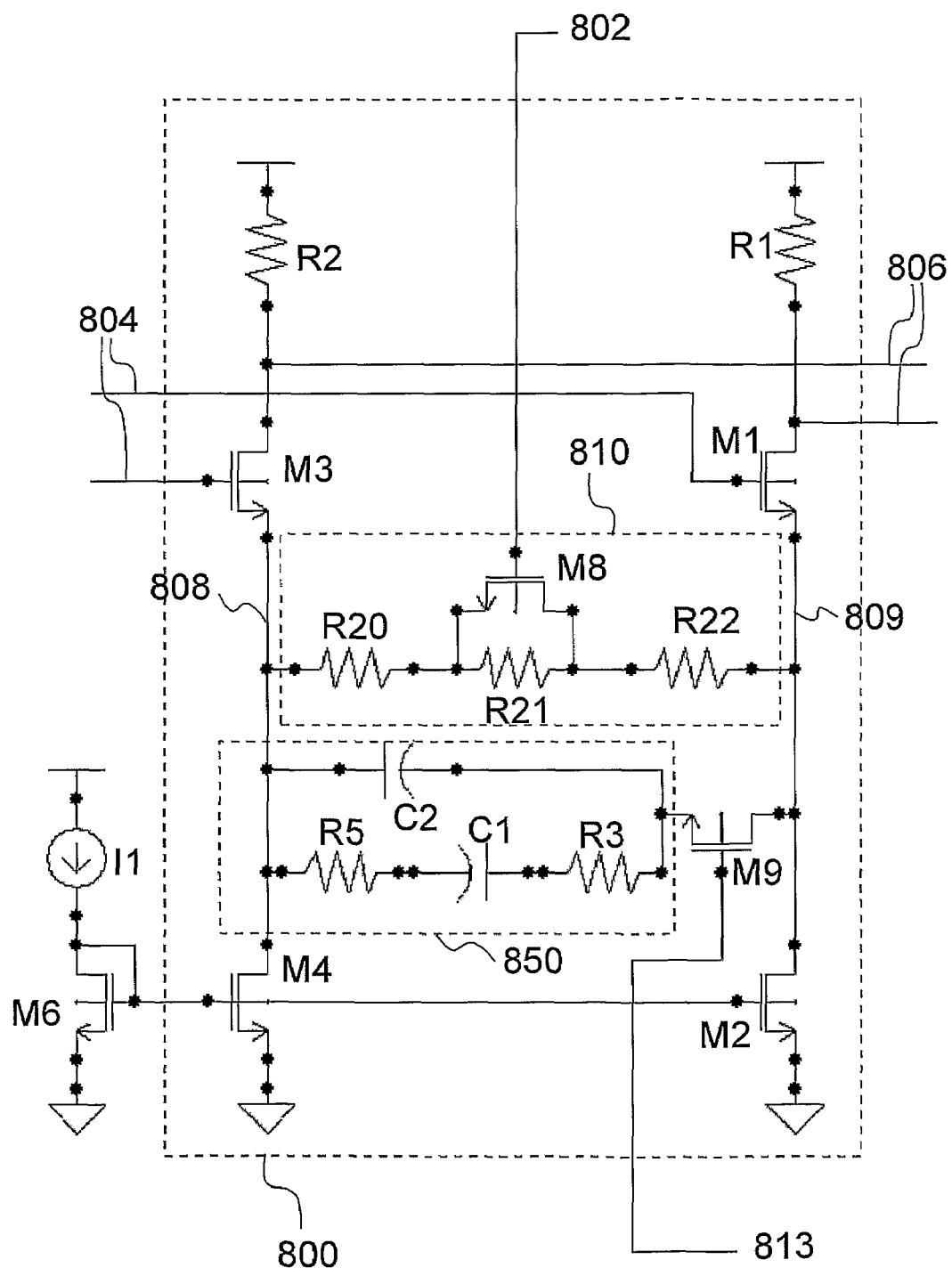
FIG. 3 shows an amplifying compensation stage whereby a first gain input terminal regulates the gain at lower frequency and whereby the higher frequency gain is regulated by an nmos transistor driven by a second gain input terminal.
Figure 4:
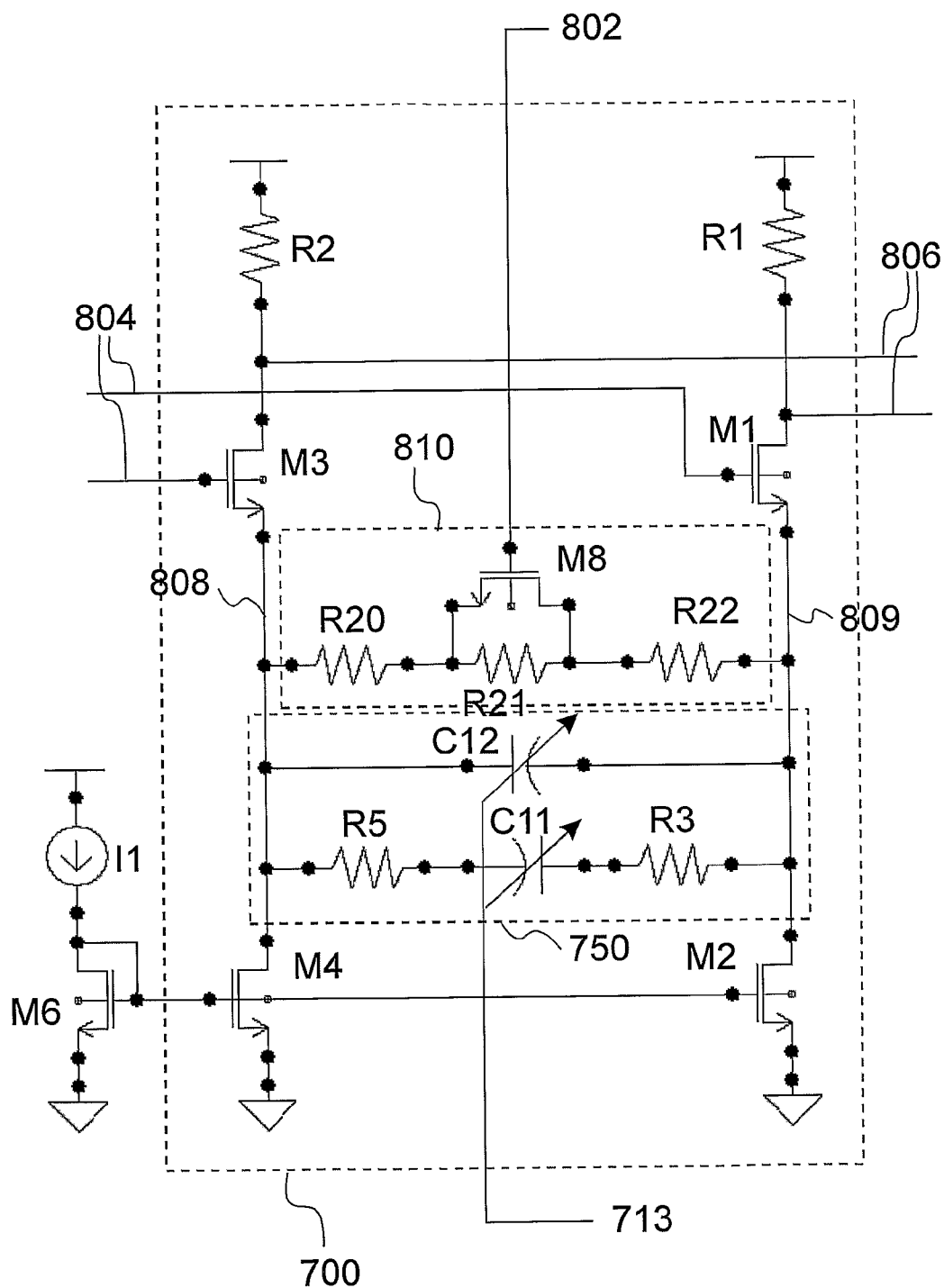
FIG. 4 shows an amplifying compensation stage whereby a first gain input terminal regulates the gain at lower frequency and whereby the higher frequency gain is regulated by two varactors that are driven by a second gain input terminal.

FIG. 4 illustrates another embodiment of an amplifying compensation stage 700, whereby the gain at lower frequency is similar to that of FIG. 3, and consequently the circuit implementation is the same or analogous, but whereby the higher frequency gain is regulated by a higher frequency gain function circuit 750 which, rather than being connected between the nodes 808, 809 over an analog switch as transistor M9 in FIG. 3, now comprises varactors (variable capacitors). In the embodiment illustrated in FIG. 4, the higher frequency gain function circuit 750 comprises a series connection of a first resistor R5, a first varactor C11 and a second resistor R3. This series connection is coupled in parallel with a second varactor C12. The capacitance values of the varactors are changed by applying a gain control signal to a second gain input terminal 713.

PCT/EP04/001414 explains how varactors or variable capacitors can be made of inversion type PMOS transistors (based on inversion). Another option is to use NMOS varactors based on depletion, well-known to the person skilled in the art. The advantage of both varactor systems is that the semiconductor technology does not require having a capacitor module, making the solution lower cost. The disadvantage is that varactors have a limited dynamic range, certainly when operating at a reduced power supply voltage. A capacitance modulation of a varactor between e.g. 50 and 140 fF may be feasible, a modulation between 10 and 140 fF is typically practically very difficult.

In the amplifying compensation stage 700 illustrated in FIG. 4, ideally, varactor C12 would be modulated between 0 and 100 fF by means of a gain control signal on the second gain input terminal 713, and varactor C11 would be simultaneously modulated between 0 and 280 fF.

Figure 5:
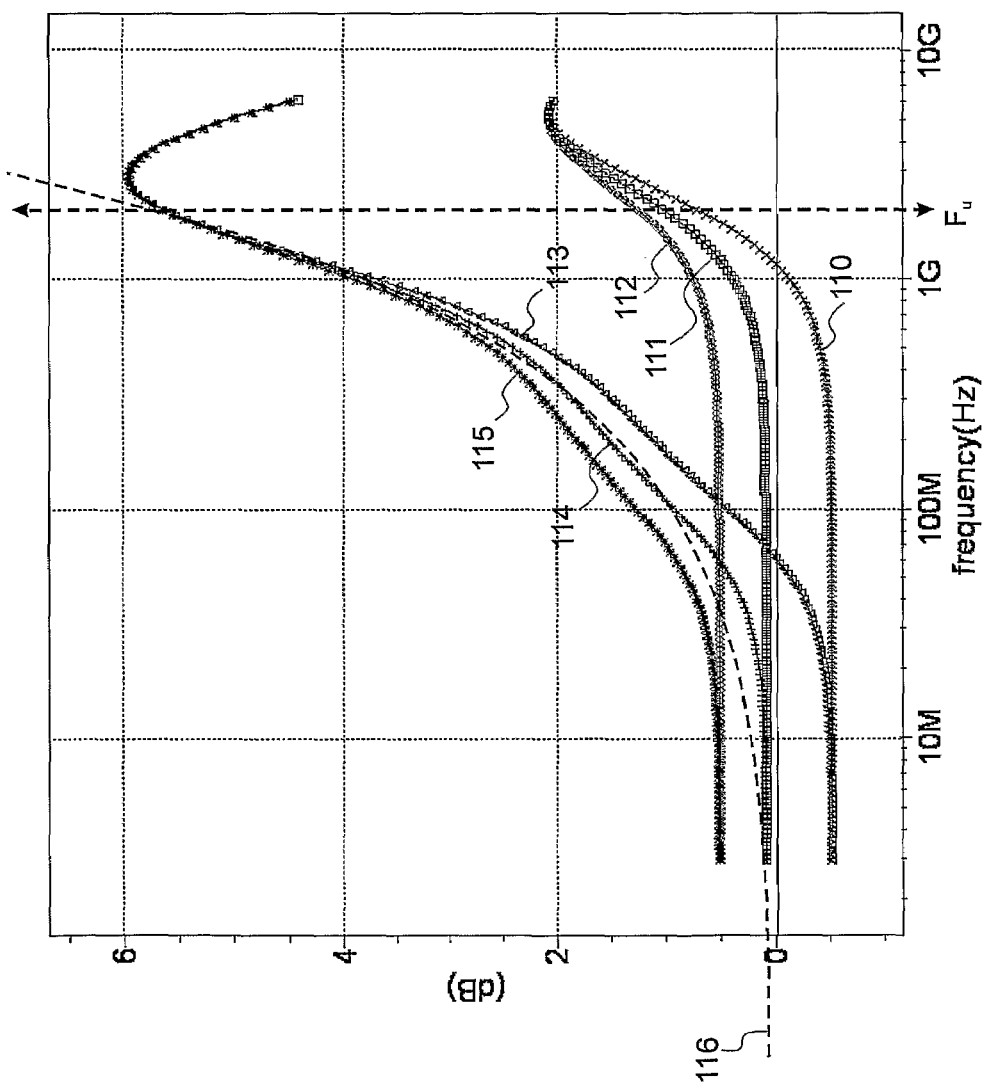
FIG. 5 shows the influence on the gain of the applied voltages on the first and the second gain input terminals, in function of the frequency curves of the amplifying compensation stage and a target gain curve.

FIG. 5 shows the gain in function of the frequency of amplifying compensation stage 800 illustrated in FIG. 3, for a voltage on the first gain input terminal 802 of 1V (curves 110 and 113), 1.1V (curves 111 and 114) and 1.2V (curves 112 and 115) respectively. Curves 113, 114 and 115 are for turned ON higher frequency gain (i.e. a voltage of 1.8 V being applied to second gain input terminal 813), while curves 110, 111 and 112 are for the higher frequency gain function circuit 850 being turned OFF (voltage on second gain input terminal 813 being 0V). This demonstrates the effect of different voltages at the first gain input terminal 802. For the voltages of 1V, 1.1V and 1.2V respectively, −0.5 dB, 0.1 dB and 0.55 dB of gain is obtained at frequencies below 30 MHz. If there is no higher frequency gain, i.e. the gain control signal applied to the second gain input terminal 813 is low, then the amplification remains at this level up to 1 GHz, where the amplification slightly increases (up to about 1 dB at the upper data frequency $F_u$ of 2 GHz for the given target bit rate of 4 Gbps) due to remaining parasitic capacitance on the nodes 808 and 809.

In order to make this amplifying compensation stage 800 a stage that has good equalizing properties, the values of the resistor and capacitor components are to be thoughtfully chosen. A way to proceed for making these choices may be the following. First the gain input voltage at the first gain input terminal 802 must be set preferably in the middle of its regulation range, such that there is a possibility for a considerable change in lower frequency amplification gain in both directions, i.e. when increasing and decreasing the voltage on the first gain input terminal 802. In an implementation of the present embodiment, a voltage of 1.1V has been chosen and the higher frequency gain function circuit has been turned ON, yielding curve 114 in FIG. 5. Subsequently, the loss curve of a target transmission channel has to be inverted into a target amplification curve (curve 116 in FIG. 5, in case of RGU coax). Thereby the length of the cable has to be tuned such that the achievable amplification at the upper data frequency $F_u$ matches the loss of the cable (in the present example illustrated in FIG. 5 there is about 5.5 dB of gain at $F_u$). Then the values of the components of the higher frequency gain function circuit 850, i.e. in the example given capacitance of capacitor C1, capacitance of capacitor C2, resistance of resistor R3 and resistance of resistor R5, have to be chosen to maximally achieve a good fit between curves 116 and 114. Hereby R3 may be taken equal to R5 or R3 and R5 can be taken as a single resistor. The result, as shown in FIG. 5 is that curves 116 and 114 match relatively well up to the upper data frequency $F_u$. The difference between those curves in the example given is less than +/−0.3 dB, which is a sufficient match in most applications.

Thus, in case the switch for switching higher frequency gain function circuit 850 ON or OFF is closed, thus the switch is ON, e.g. transistor M9 conducts fully, matching is achieved between a certain length of the target transmission channel and the compensation of the amplifying compensation stage 800. However, when having an intermediate tuning value or frequency gain control signal (of e.g. 1V) on the second gain input terminal 813, i.e. the switch is not completely ON nor completely OFF, a non-ideal, non-linear, large signal transfer, depending on the input signal (as well on its differential as on its common mode components) will occur. Fortunately, by limiting the target amount of higher frequency gain compensation to a value of about 5 dB per stage, and by keeping low the number of stages that is in this intermediate condition, preferably only one, the resultant effect of this non-linear non-ideal behaviour remains limited and this will result in an acceptable limited additional jitter. This is in more detail explained in co-pending patent PCT/EP04/001414.

For determining the capacitance values of variable capacitors C11 and C12 in the varactor type of amplifying compensation stage 700 as illustrated in FIG. 4, an analogous procedure holds, and the same values can be implemented. The maximum values of varactors C12 and C11 may be same as the capacitance values of C2 and C1 respectively.

Figure 2:
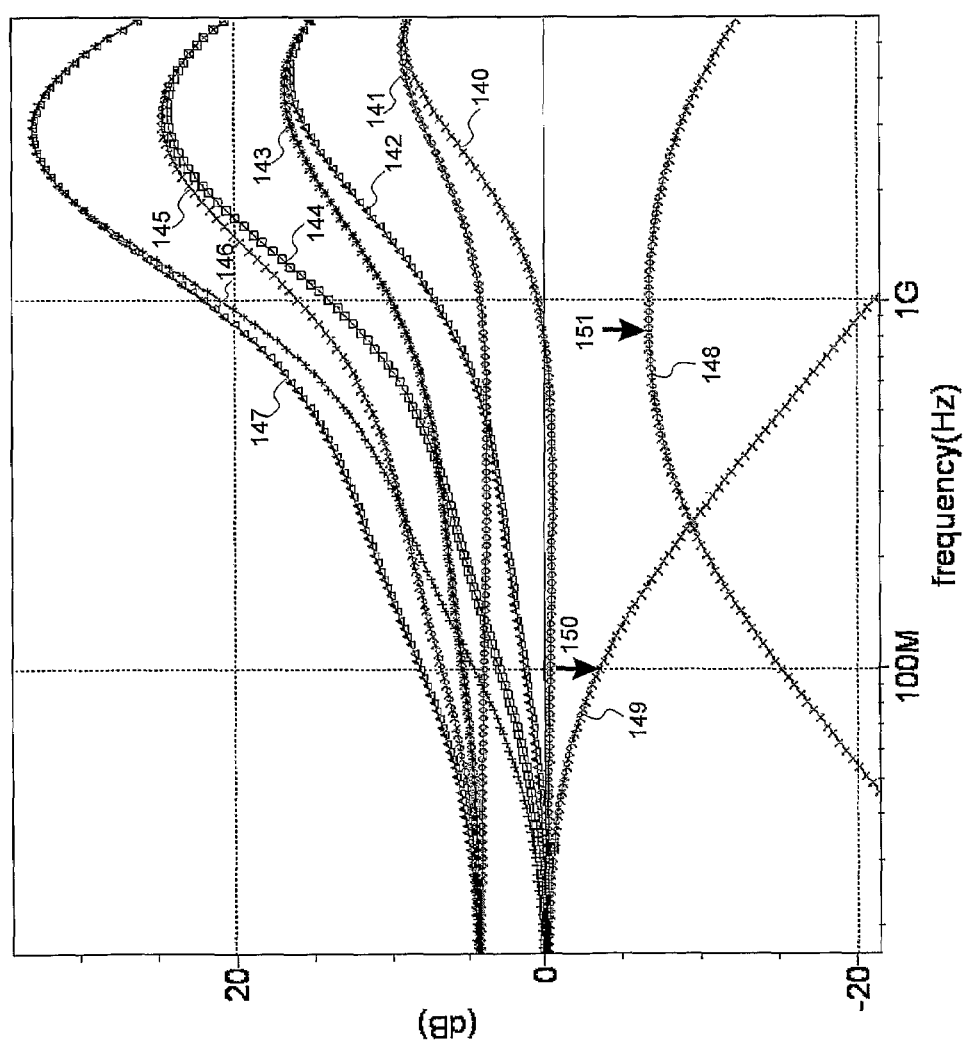
FIG. 2 shows gain versus frequency curves of the amplifying compensation stage together with low pass and band pass filter curves respectively.

FIG. 2 shows the overall gain curve of a cascade of 6 amplifying compensation stages 800, one of which is illustrated in FIG. 3, whereby the first gain input terminals 802 are connected together and driven at a voltage of 1.1 V, i.e. each amplifying compensation stage receives a same gain control signal, yielding curves 140, 142, 144 and 146, and at 1.3 V yielding curves 141, 143, 145 and 147. In the case of curves 140 and 141, the higher frequency gain is turned OFF in all 6 stages. Curves 142 and 143 show the case whereby the higher frequency gain is turned ON in 2 stages, curves 144 and 145 is for the case whereby the higher frequency gain is turned ON in 4 stages, and curves 146 and 147 is whereby all 6 stages' higher frequency gain is turned ON. Further are shown a low-pass filter curve 149, having its −3 dB point 150 at 100 MHz, and a band-pass filter curve 148 having its centre frequency 151 at 800 MHz. These filtering characteristics are used in adaptive equalizer circuit illustrated in FIG. 1.

For many applications the dual loop as presented in FIG. 1 can be sufficient. An output circuit 20 can still be used for making the signal on the output node 19 of the limiting amplifier 88 somewhat more digital and/or for bringing the output voltage and impedance to their specified levels on output node 32.

In the given circuit 1200 of FIG. 1, it is assumed that the lower frequency gain control signals to the amplifying compensation stages are driven in parallel, in other words, a single voltage is determining the gain at lower frequencies for all stages 21a, 21b, 21c, 21d at once, determining the overall gain of the cascade of amplifying compensation stages. At this gain input side however, a consecutive switching-ON strategy may be considered as well using a circuit similar to feed-back circuit 50 for switching ON or OFF the higher frequency gain. There may be an advantage in signal to noise ratio, but one has to check whether no high-speed signaling nodes get into saturation.

On the other hand, one can also consider driving the higher frequency gain inputs with a same signal or voltage, instead of with a system of a type with a feed-back circuit 50. In most cases, when using stages of the type as the amplifying compensation stages 800 in the cascade chain of stage 21a, 21b,

21c, 21d this will not yield good performance. When, however, implementing the varactor type of amplifying compensation stage 700, there is a chance that sufficient, although only moderate, performance can be reached. Varactors have a capacitance value that is depending on the signal that they are carrying, and possibly, when keeping the general signal amplitudes low, one will not suffer too much from the non-linear effects this dependence will be leading to, even in a cascade of stages with simultaneously driven higher frequency gain inputs. In order not to encounter these type of problems the use of sequential turning ON of stages is however preferred, even for the varactor type of amplifying compensation stages 700.

Figure 6:
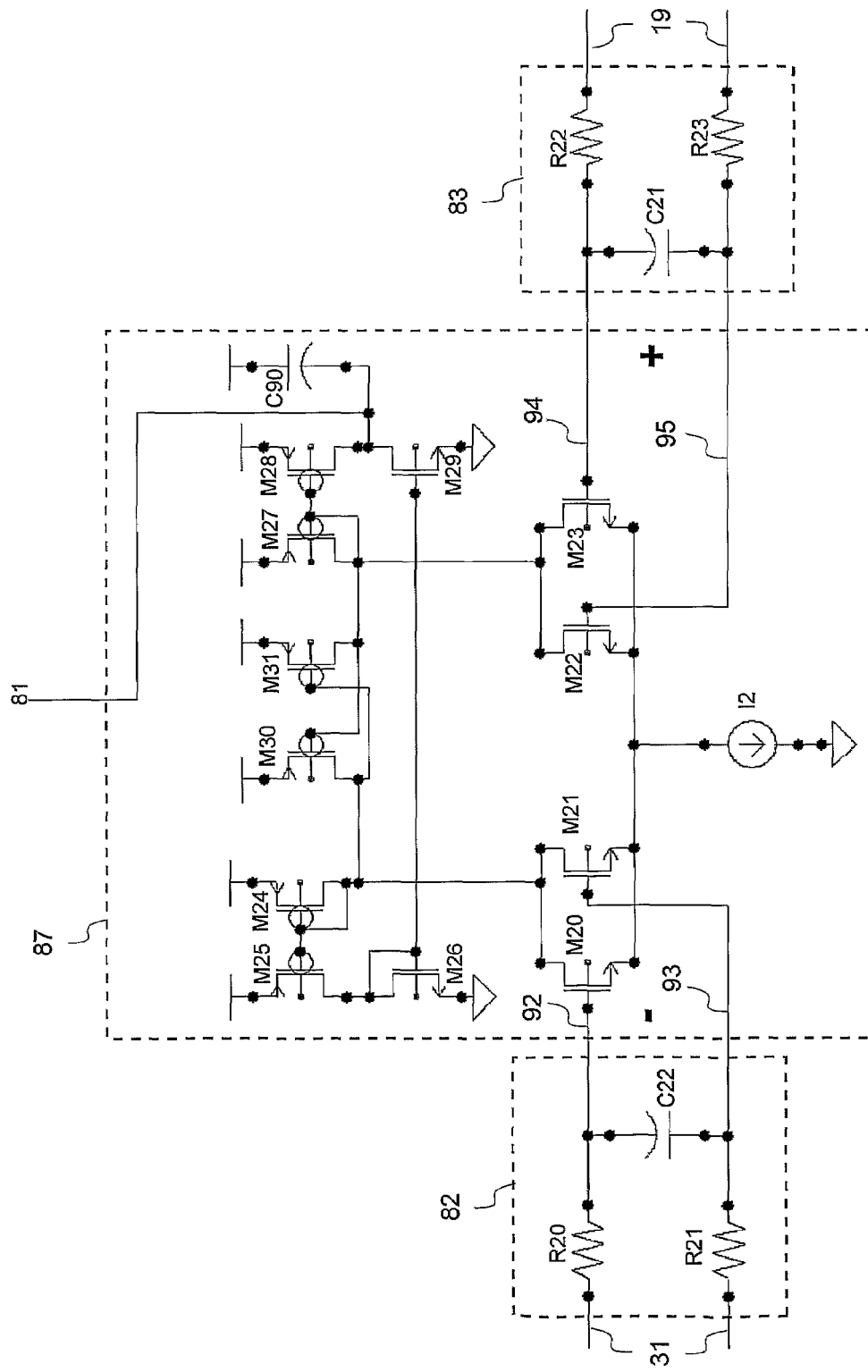
FIG. 6 shows a schematic representation of two low-pass filters connected to a differential rectifying comparator.

FIG. 6 shows an embodiment of filters, e.g. low-pass filters 82 and 83, coupled to a prior art comparator 87. In the example given, the resistors R20, R21, R22, R23 may have a value of e.g. 30 kΩ and the capacitors C22, C21 may have a value of e.g. 20 fF. Hereby one should also include the parasitic capacitance of the connected gates of transistors M20, M21, M22, M23 of the comparator 87. FIG. 6 further shows the way signals may be compared with the comparator 87, and will be explained below.

In state-of-art equalizers one typically follows a somewhat different principle (see also U.S. Pat. No. 6,304,615). The signals at the outputs of the filters 82, 83 are first rectified, and therefrom one creates subsequently two amplitudes, each corresponding to a difference signal between the two output nodes of the filters 82, 83 respectively, which amplitudes thereafter get compared. This is a relatively complex process, in the sense that it requires a relatively large set of transistors, where during the process one heavily counts on transistor matching. Further the intermediate amplitude signal delivers an extra delay, which should be taken into consideration when performing stability analysis. The rectification also assumes signal treatment at a double frequency then the data-frequency.

Figure 7:
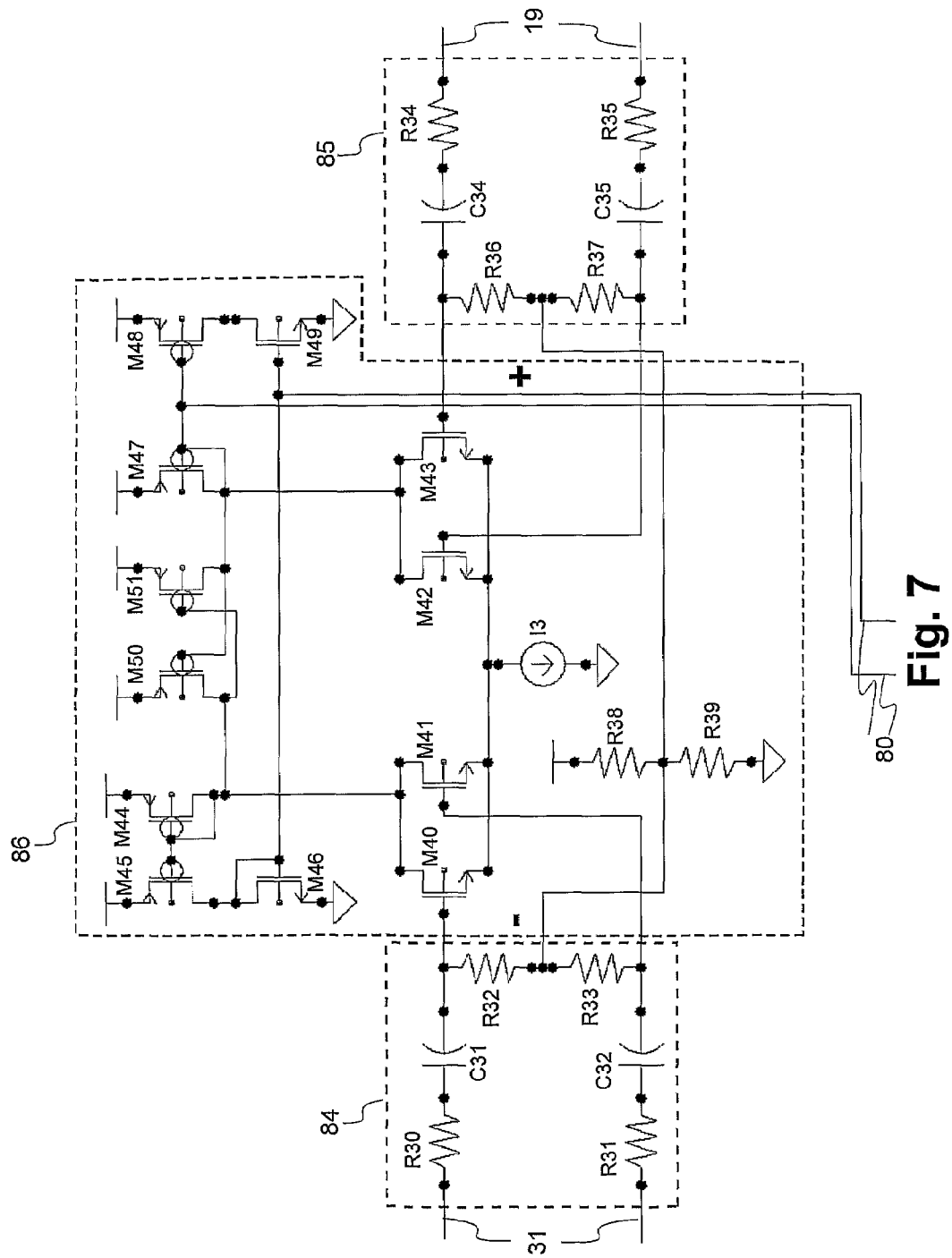
FIG. 7 shows a schematic representation of two band-pass filters connected to a differential rectifying comparator.

The system proposed herewith in accordance with an embodiment of the present invention is an improvement of the comparator 87 in FIG. 6 (and also comparator 86 in FIG. 7). Instead of having one transistor for each input side of the rectifying comparator 87, so as to be able to compare the amplitudes as explained hereinabove, according to an embodiment of the present invention two transistors for each input side are provided. The negative input side of comparator 87 has the gate 92 of transistor M20 and the gate 93 of transistor M21 as input terminals, and the positive input of comparator 87 has the gate 94 of transistors M22 and the gate 95 of transistor M23 as input terminal. The four input transistors M20, M21, M22, M23, have a common source that is driven by a current source 12. This way of comparing two differential signals is very fast, has little offset and is inherently rectifying, as the highest signal in voltage at the positive input side is taken for comparison with the highest signal in voltage at the negative input side. The offset is determined mainly by the matching between transistors M20, M21, M22 and M23. The width W of these transistors should be taken as large as possible, for improving the matching of these transistors, with small length L for still having a fast responsive. As an example of a design these transistors may have W=20 um and L=180 nm.

The remainder of the comparator 87 may be like any other comparator and can be designed by a person skilled in the art. In the given schematic of FIG. 6, transistors M24, M25, M26, M27, M28, M29, M30, M31 constitute the remainder of the comparator. This part of the comparator may be low-speed, relaxing the conditions for achieving little input equivalent offset due to transistors mismatches in this part of the circuit. For achieving enough gain a positive feedback is included by including transistors M30 and M31 in a cross-coupled relationship. A dual stage comparator may also be implemented to increase the gain (not illustrated in FIG. 6). The output node 81 drives the gain inputs of the cascade of stages 21a, 21b, 21c, 21d, and forms the dominant pole in the loop. The capacitor C90 partly determines the time constant that regulates that loop.

An analogous way of differential comparison with inherent rectification may be used in the rectifying comparator 86 after filters, e.g. band-pass filters 84 and 85, as illustrated in FIG. 7. Resistors R30, R31, R34 and R35 may have a value of e.g. 5 kΩ and resistors R32, R33, R36 and R37 may have a value of e.g. 10 kΩ. Capacitors C31, C32, C34 and C35 may have a value of e.g. 30 fF. Since capacitors C31, C32, C34 and C35 disconnect the DC-level, this DC level has to be restored. This is achieved by generating a voltage with a voltage divider (comprising resistors R38 and R39, each having a resistance value of e.g. 1 kΩ) generating a reference voltage value of e.g. 900 mV, and supplying this reference voltage to the common nodes between resistors R32 and R33 and between resistors R36 and R37. The subsequent rectifying comparator 86 can be completely the same as the rectifying comparator 87 illustrated in FIG. 6, however here a signal 80 is exported to communicate to the feed-back circuit 50 whether there must be more or less higher frequency amplification.

According to the present invention, the loop detection mechanism can be further improved by providing a current source which is adapted to deliver a variable current. One implementation thereof may be modulating the bias current of the comparator 86, 87. The explanation that follows is based on a dual loop configuration like the embodiment of the equalizer filter 1200 in FIG. 1. However, it is also useful for multiple loop configurations, e.g. triple loop configurations, as explained below.

Figure 8:
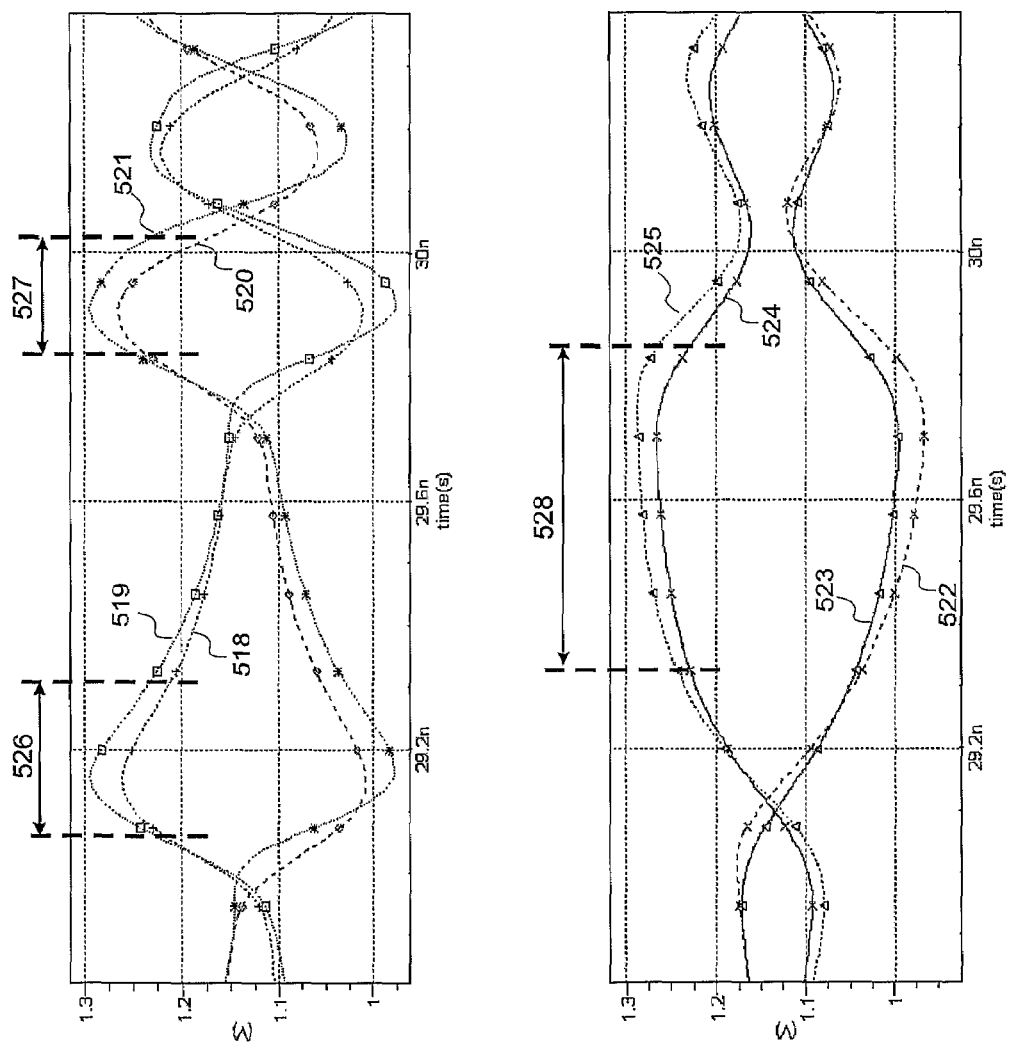
FIG. 8 shows the voltage signals on the nodes between the low pass filters and rectifying comparator of FIG. 6 and on the nodes between the band-pass filters and rectifying comparator of FIG. 7 in the case of a dual loop configuration as in FIG. 1.

FIG. 8 shows curves 518, 520 and curves 519 and 521 being the voltages versus time signals at the negative (511, 512) and positive (513, 514) input nodes (see FIGS. 9 to 11) respectively of rectifying comparator 86 in the high frequency gain determining circuit, at a moment of under-compensation, i.e. at a moment whereby higher frequency gain convergence has not yet been reached. During periods like 526 and 527, the curve of curves 519 and 521 at the positive node which is highest in voltage clearly gives a higher voltage than that curve of the curves 518 and 520 at the negative node which is highest in voltage. In other words: it is clear from the upper graph of FIG. 8 that during time period 526 curve 519 (the highest curve at the positive node during that time period) has a higher voltage than curve 518 (the highest curve at the negative node during that time period). Similarly, during time period 527 curve 521 (the highest curve at the positive node during that time period) has a higher voltage than curve 520 (the highest curve at the negative node during that time period). Therefore, time periods 526 and 527 are ideal periods for the comparator 86 to make its comparison. In the remaining periods, different from 526 and 527, differences are less pronounced, or zero. It has been noticed that time periods 526 and 527 correspond to time periods when edges or flanks in the digital signals appear at the comparator. In other words, the best periods for the comparator 86 to operate is when edges in the high speed digital signals on node 31 and 19 are taking place, i.e. when there are bit value changes.

Further, curves 523, 524 and curves 522 and 525 are the voltages versus time signals at the negative (92, 93) and positive (94, 95) input nodes (see FIGS. 9 to 11) of rectifying comparator 87 in the low frequency gain determining circuit respectively, at a moment where the lower frequency gain is still insufficient and the low frequency loop has not yet achieved convergence. During periods like 528, that curve of curves 525 and 522 at the positive node which is highest in voltage clearly gives a higher voltage than that curve of curves 523 and 524 at the negative node which is highest in voltage. In other words: it is clear from the bottom graph of FIG. 8 that during time period 528 curve 525 (the highest curve at the positive node during that time period) has a higher voltage than curve 524 (the highest curve at the negative node during that time period). Therefore, time period 528 is an ideal period for the comparator 87 to make its comparison. In the remaining periods, i.e. periods different from period 528, differences are less pronounced, or zero. It has been noticed that time periods 528 correspond to time periods when no edges in the digital signals appear at the comparator. In other words, the best periods for the comparator 87 to operate is when there are no edges in the high speed signals on node 31 and 19, i.e. when there are no bit value changes.

According to the present invention, the detection mechanisms for the lower and higher frequency gain loops can be improved considerably by modulating the comparator bias currents I2, I3, i.e. by increasing these currents at moments where the differences in voltage between signals at the positive and negative inputs are most pronounced and useful. In general, this principle is summarized in FIG. 9, by having current sources I2 and I3 being modulated by a suitable modulation signal on nodes 510 and 515, thus generating modulated currents I22 and I33 respectively. The modulation signals on nodes 510 and 515 can be derived from high-speed data nodes such as nodes 31, 19 or 32. A person skilled in the art is able to make a detector for detecting bit value changes in the data at nodes 31 and 19, i.e. edges. From a generated detection signal indicating edge presence or absence, it can be deduced in accordance with what has been described above which of the comparators 86, 87, the one for the high frequency gain loop or the one for the low frequency gain loop, need to operate, and thus which of the current sources I2, I3 need to be ON. This is implemented by the current source modulation signals 510, 515. Transistors M20, M21, M22, M23 and current source I2 are part of comparator 87 and transistors M40, M41, M42, M43 and current source I3 are part of comparator 86 as illustrated as an example only in FIGS. 6 and 7 respectively, whereby same names or reference numbers demonstrate correspondence between the drawings.

Figure 10:
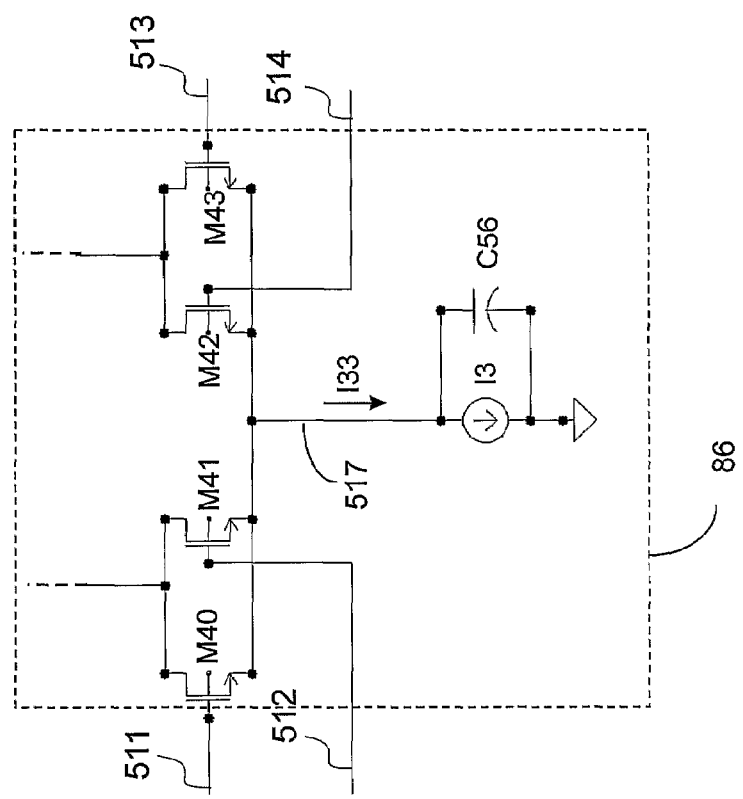
FIG. 10 shows part of the comparators as in FIGS. 6 and 7 according to a second embodiment of the present invention.
Figure 10:
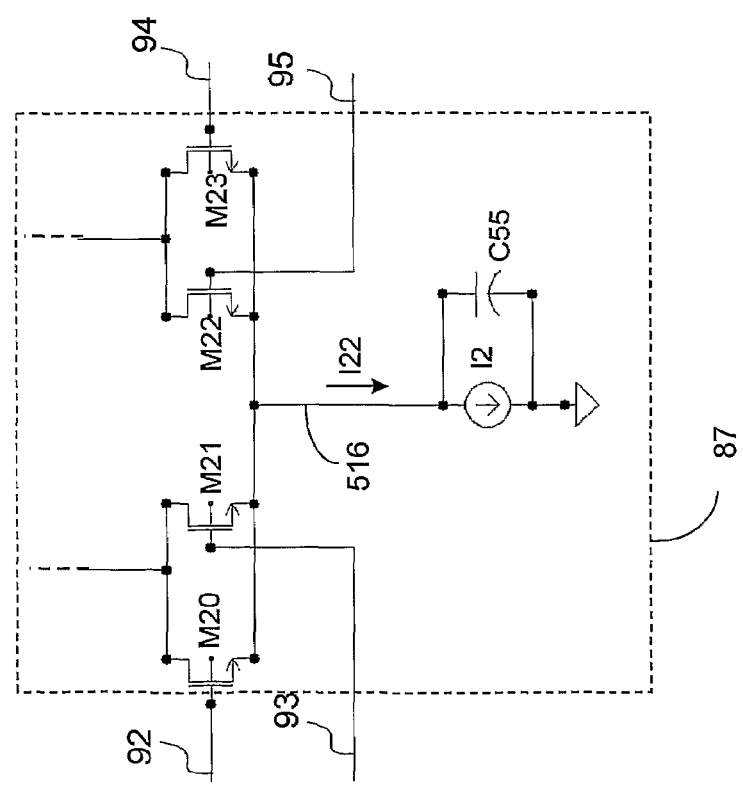

Although the above implementation, with an edge detection circuit being used for generating current source modulation signals is acceptable, a preferred embodiment of the present invention is to use the solution presented in FIG. 10. In this embodiment, rather than using modulatable current sources, fixed current sources I2 and I3 are used, and by paralleling them with capacitive elements, such as capacitors C55 and C56 respectively, the currents I22 and I33 get modulated in a way that serves the purpose of achieving increased comparator performance in the appropriate periods, i.e. in periods when there are edges in the data signal for comparator 86, and in periods when there are no edges in the data signal for comparator 87. Capacitors C55 and C56 may in the present example be of the order of 1 pF. These capacitors will deteriorate the high frequency common mode rejection of the respective comparator and will give preference to comparison of signals of high voltage, due to bias current that will increase automatically since the common source nodes 516 and 517 are not able to follow quickly enough.

Figure 12:
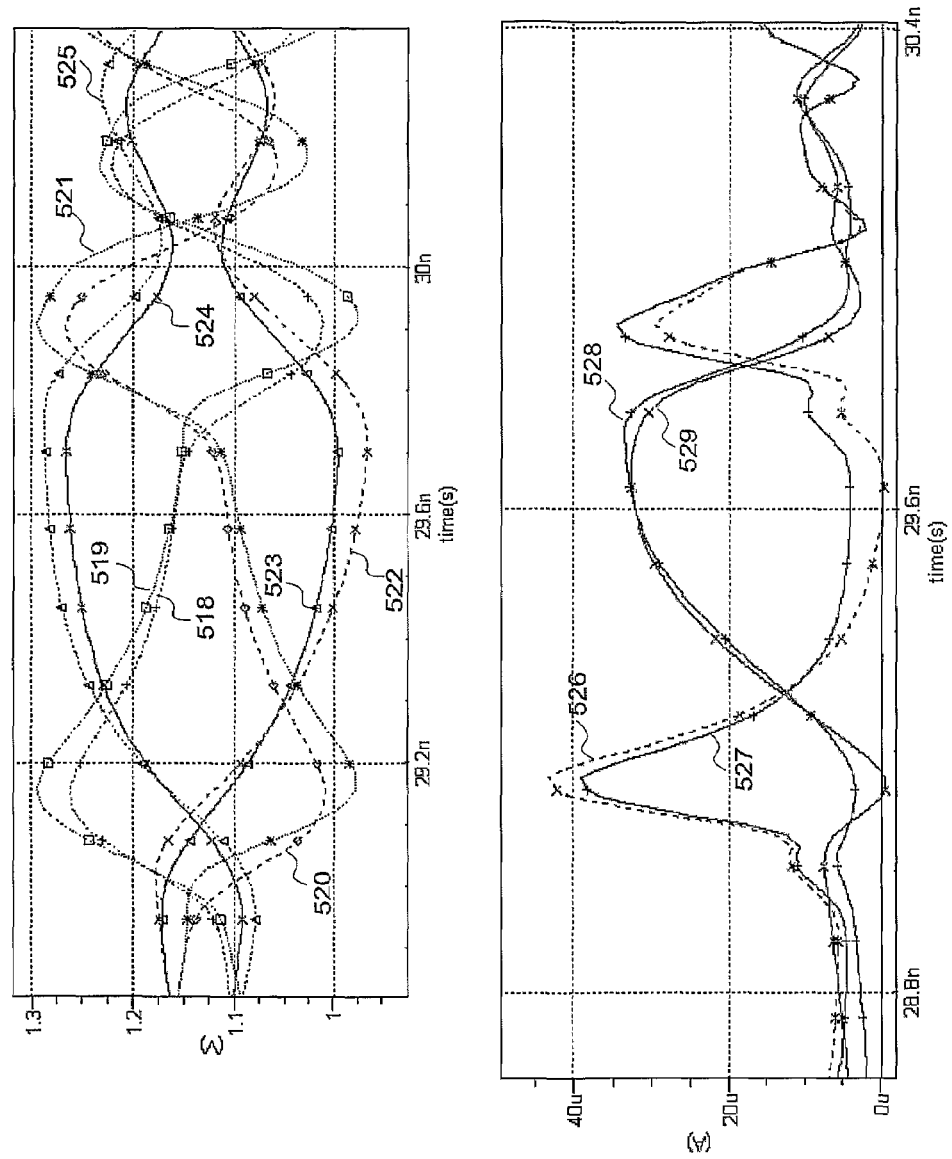
FIG. 12 shows the same curves as the ones in FIG. 8, however complemented with the modulated currents based on deterioration of high frequent common mode rejection as proposed in FIG. 10 and on having a common source node as proposed in FIG. 11.

FIG. 12, bottom graph, shows the currents I22 and I33 versus time (curves 528 & 527) demonstrating that simulated current 527 (I33) becomes HIGH (40 uA) at 29.2 ns, when due to a transition on the nodes 31 and 19, the band-pass filters 84, 85 give high voltages (and high voltage differences) seen on curves 518 and 519 respectively (being the curves with the highest voltage at that time). Conversely, during a period of no transitions on the high-speed data nodes 31 and 19, the curves 524 and 525 (being the highest voltages of the voltages on the nodes at the output of the low pass filters 82 & 83, at the input of the comparator 87) show a high voltage difference having a high voltage at the same time. The simulated respective comparator current I22, shown on FIG. 12 by curve 528 also is high during these periods.

In other words, by using comparator structures having a bad high frequency common mode rejection is advantageous for the comparison in the given situation, since it will increase comparison performance during periods where the input voltage signals are highest, and where in the present case, also the difference signals are largest and most meaningful for the respective detector function. In this way, during periods of steady digital values (no signal edges on node 31), comparator 87 will be most active, and during signal edges comparator 86 will be most active.

The deterioration of the high-frequency common mode rejection can also be achieved by operating the comparator at lower current, and choosing the current level in a window in which the high frequency common mode is deteriorated, and whereby still the comparator itself is fast enough to perform its high-speed comparison. If the window of operation becomes too narrow, an additional capacitor can still be used to deteriorate the common mode performance.

Figure 11:
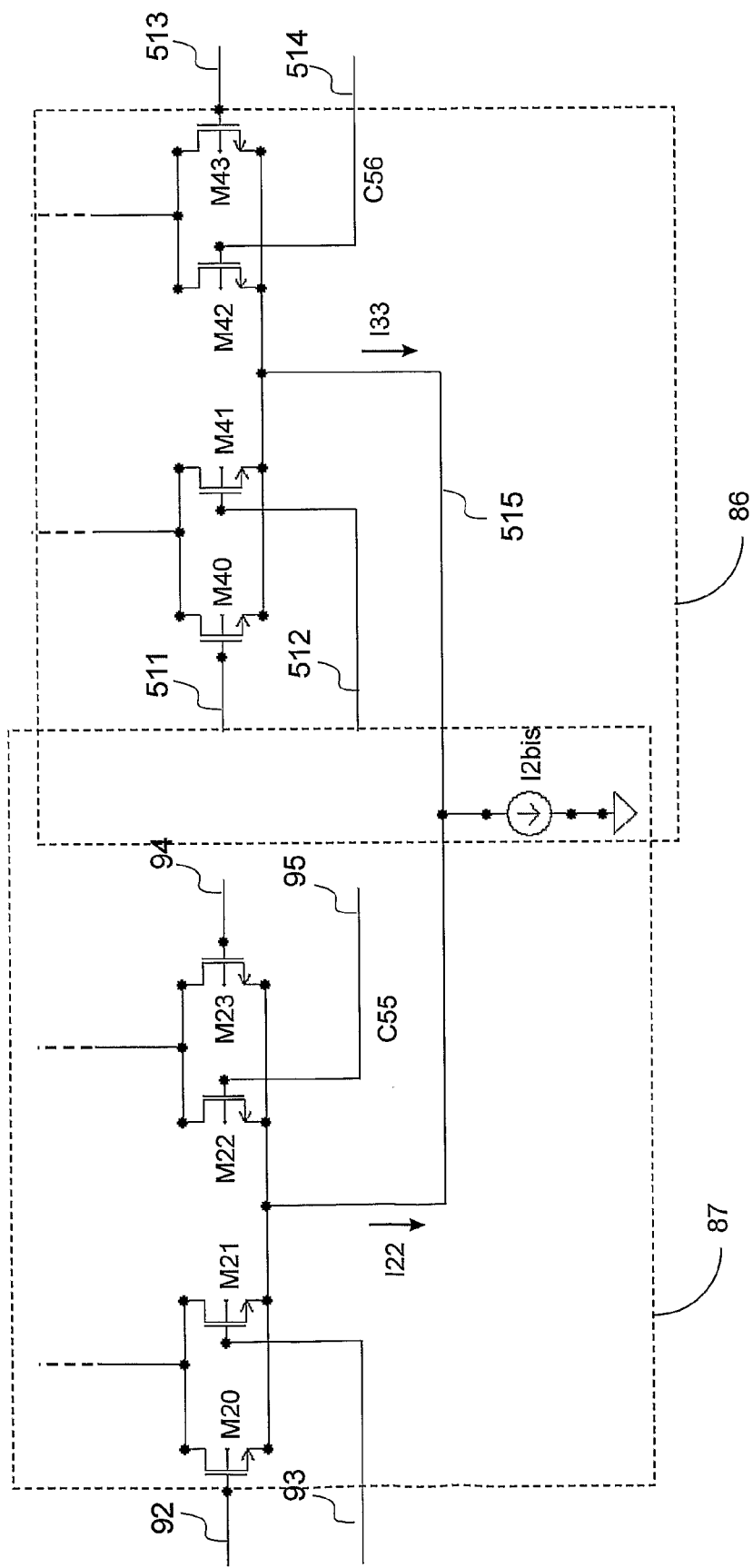
FIG. 11 shows part of the comparators as in FIGS. 6 and 7 according to a third embodiment of the present invention.

The embodiment of FIG. 11 achieves about the same result as the one in the implementation of FIG. 10, however, we can win the area of two capacitors C55 and C56 since they are not longer required. To this end the common source nodes 516 and 517 of the two comparators 86, 87 are tied together, giving together one common, common source node, being node 515. This common, common source node 515 is connected to one current source, labelled I2*bis* in FIG. 11. Now the transistor of the set of transistors (M20 . . . M23 & M40 . . . M43) that sees highest voltage at its gate will conduct most of the bias current I2*bis*, and in that way, automatically its respective comparator 86, 87 will be active and operate fully. In this way, the following result is achieved: during periods of no signal edges, comparator 87 will be most active, and during signal edges comparator 86 will be most active. The current I33 in FIG. 11 is represented by curve 526 in FIG. 12, and current I22 in FIG. 11 is represented by curve 529 in FIG. 12.

In a single loop structure the solution with high-frequency common mode deterioration is preferred, since it is the only option. In the case of multiple loop configurations, e.g. dual or triple loop configurations, the solution with the common, common source node has preference. To let the latter operate well, however, it has to be ensured that for the given bit rate range, the used rectifying comparators 86, 87 each get their time to operate during alternating periods. To ensure this, the common mode voltage of all the signals coming out of the filters 82, 83, 84, 85 (and in case of triple loop also 89 & 90) must be the same by construction. Also during operation, the voltage levels should peak one after the other. A person skilled in the art can design the filters 82, 83, 84, 85 accordingly. The preference for this solution is also given by the fact that there is always one comparator that has the largest current at a time. There is in other words only very little or no overlap. The solution with the capacitors coupled in parallel over the current source, as illustrated in FIG. 10, will not guarantee the absence of overlap, since the detectors 86, 87 are operating fully independently.

From extensive simulations and also from CMOS made devices (dual loop), it can further be concluded that by comparator current modulation, the detector acquires improved robustness, and even remains working well in multi-rate mode. Previously, it has been stated that the pass-band of the filters should match the "being regulated frequency" as much as possible. However, by modulation of the comparator current, this requirement becomes much less strict.

Figure 13:
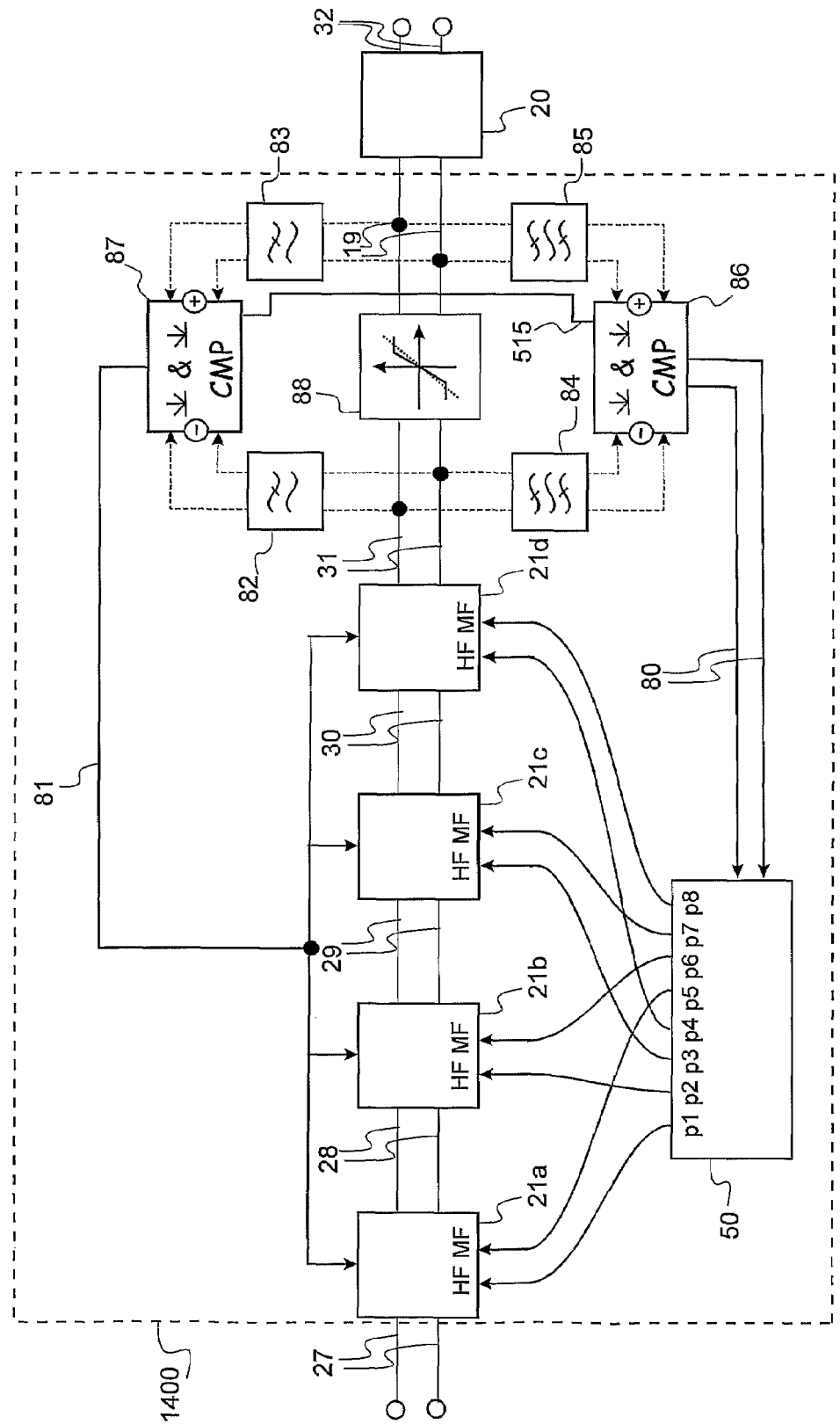
FIG. 13 shows a schematic representation of an adaptive equalizer filter having a second self-adapting compensation control loop according to an embodiment of the present invention whereby multi rate operation can be achieved based on dual loop operation and on having a common source node for both comparators.

A detector can therefore be achieved, according to embodiments of the present invention, that has wide multi-range detecting capability helped by this less strict correspondence between detected frequency and regulated frequency. It becomes feasible to make a multi-rate equalizer that has one common loop for the higher and the mid-frequencies using a single such multi-rate detector. The design of such dual loop is easier than that of the aforementioned, and explained below, triple loop for multi-rate equalization. FIG. 13 shows the set-up of such a multi-rate dual loop equalizer. Module 50 first turns-on sequentially the higher-frequency gain branches in the amplifying compensation gain stages 21*a* . . . 21*d* by turning ON high frequency gain signals p1 to p4, followed by turning ON the mid-frequency gain branches in the amplifying compensation gain stages 21*a* . . . 21*d* by turning ON mid frequency gain signals p5 to p8. The amplifying compensation gain stages are in this case preferably of the type 1100 like in FIG. 19 and designed according to the aforementioned guidelines. An extra wire 515 in FIG. 13 connects the common mode node from both comparators to achieve the preferred and desired current modulation, as in FIG. 11.

Hereinafter, some more details are given about other parts of the equalizer filters according to embodiments of the present invention.

Figure 14:
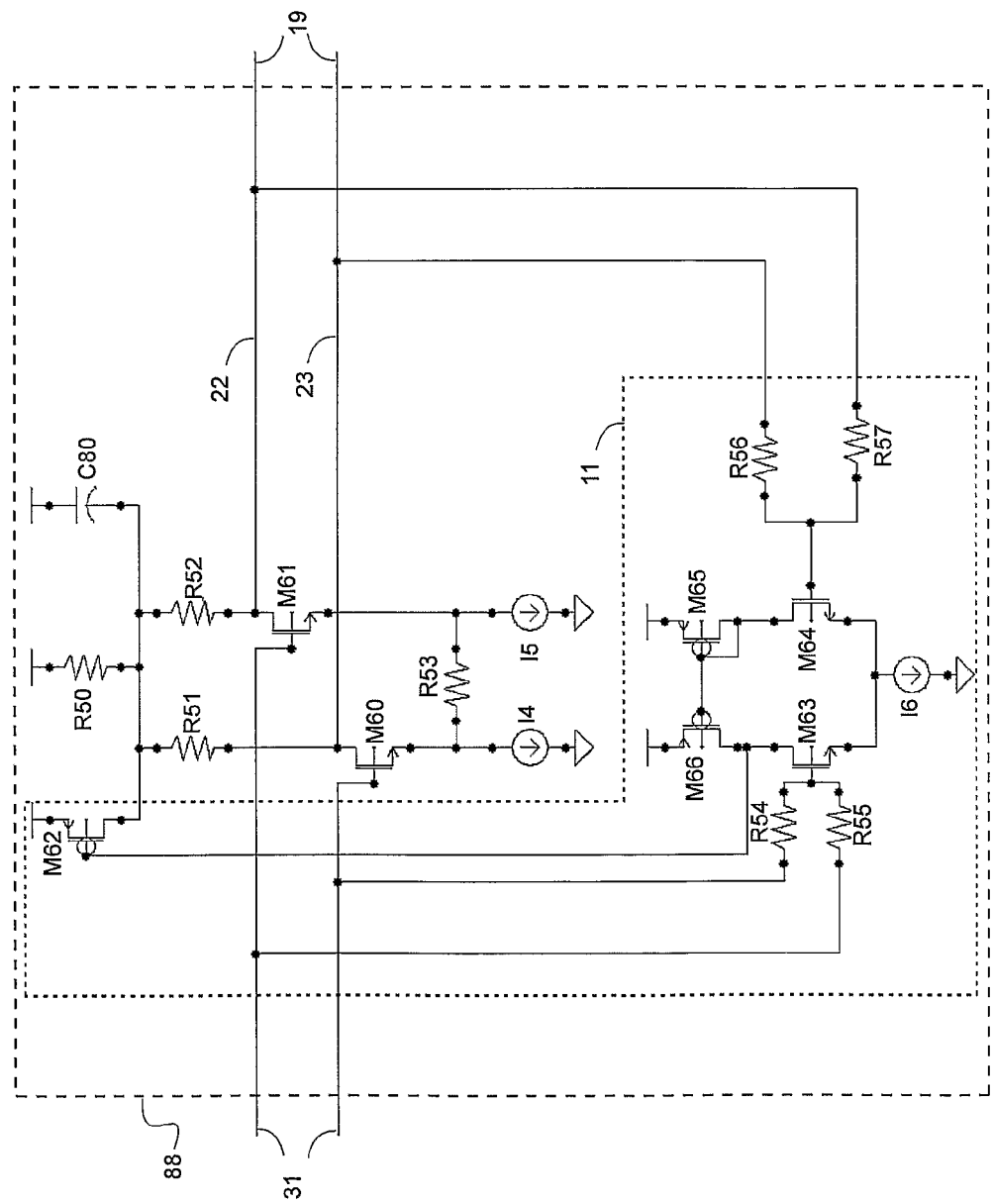
FIG. 14 shows a schematic representation of a limiting amplifier.

FIG. 14 is a schematic representation of a limiting amplifier 88. Conventional limiting amplifier circuits comprise comparators, bit-slicers, signal restorers, and signal quantizers. These circuits convert an analog input signal at node 31 into a digital output signal at node 19. A positive differential input signal voltage is hereby amplified to one digital state, and a negative input signal voltage is hereby amplified to the other digital state. A high gain is assumed to achieve this; otherwise one cannot get a digital output.

The disadvantage of this principle is that it requires at high speed a set of power consuming amplifiers, further delivering very steep edges at the output node 19, which steep edges can be much steeper than the edge steepness of the originally transmitted signal.

A preferred principle of the present invention is to limit the amplification gain of the limiting amplifier 88 to a lower value, e.g. below 10 dB, preferably limited to 5 dB in the full frequency range at least up to the upper data frequency $F_u$. This amplification saturates at a pre-determined differential voltage depending on the resistor circuit in the limiting amplifier 88, e.g. at a differential voltage of plus or minus 650 mV. One may also refer to this as clipping or limiting amplification.

In order to achieve a differential amplifier that has a controlled gain of e.g. 3 dB and in order for amplification to saturate at a given voltage level, the implementation of a limiting amplifier 88 as in FIG. 14 may be used. Part 11 of this circuit is a low-speed common mode regulator that regulates that the output common mode voltage at output node 19 becomes the same as the input common mode voltage at input node 31. This allows rectifying comparator 87 to properly compare the low frequency components. The remainder of the limiting amplifier circuit 88 is for amplifying the differential part of the incoming signal. Transistors M60 and M61, connected on the input line between the input node 31 and the output node 19 can be regarded as voltage followers, generating a difference current through resistor R53, coupled between the sources of transistors M60 and M61, which difference current is in proportion to the differential voltage applied at input node 31. This difference current will be conducted through transistors M60 and M61, together with their biasing currents I4 and I5. The current difference will generate over resistors R51 and R52, each coupled in series with the drain of one of transistors M60, M61, a difference in voltage, that becomes the difference at the output of the amplifier at node 19. At a too large input voltage the system will saturate at a given output voltage. A person skilled in the art can easily determine the obtained amplification factor and saturation level. Resistor R50, coupled in series with a parallel connection of two branches, each branch comprising a series connection of a transistor M60, M61 and a resistor R51, R52, is present in order to obtain that the top of the eye diagrams on the single ended-nodes 22 and 23 of output node 19 have an offset (here about 300 mV) from the power supply voltage, e.g. 1.8 V, in other words to keep the common-mode level at about 1.1V in the present example. In the present example, as an example only the following values may be used:

R53=100 Ω,
R51=R52=550 Ω,
R50=275 Ω,
C80=100 fF,
transistors M60 and M61 having W/L=10 um/180 nm.

Resistors R54 and R55 of the low-speed common mode regulation circuit measure the input common mode at the input node 31, resistors R56 and R57 of the low-speed common mode regulation circuit measure the output common mode at the output node 19, and with a negative feedback loop the gate voltage at transistor M62 is regulated such that the output common mode is the same as the input common mode voltage (being about 1.1V in the present example). As an example, the resistors in the low-speed common mode regulation circuit may e.g. have a resistance value R54=R55=R56=R57=10 kΩ. The circuit 11 is non-critical and can operate in a low-speed mode.

An alternative arrangement is whereby (not shown) the amplification of the limiting amplifier 88 has about a unity amplification, so an amplification of 0 dB up to a saturation or clipping level (e.g. 650 mV in the example). This makes the edges' steepness of the differential signal before and after the limiting amplifier substantially the same. In that case a controlled offset in the comparators 86 and 87 may be built in, such that due to positive feedback the gain and the compensation level will grow until the signal at the input of the limiting amplifier will be exceeding the signal at the output of the limiting amplifier by about this built in offset voltage. This can e.g. be achieved by increasing the width W of transistors M22 and M23 in comparator 87 and M42 and M43 in comparator 86 by 10 to 20%. By increasing the offset more in comparator 86 for the higher frequencies than in comparator 87 for the lower frequencies, a controllable overcompensation may be targeted. This arrangement of unity amplification is especially useful in cases whereby a high compensation level has to be reached and whereby the signal at the entrance of the limiting amplifier is not likely to have steep edges.

The dual loop adaptive equalizer filter 1200 as illustrated in FIG. 1 can handle different transmit amplitudes, e.g. in a range of a factor of two in amplitude (6 dB range). Also, to some extent it can handle a set of different types of transmission channels having a somewhat different attenuation characteristic as the one used for calibrating the internal gain amplification stage 800 as in FIG. 3.

For cable attenuation typically two loss mechanisms exist: there are dielectric losses and skin-effect losses. Typically newer types of cable use different dielectrics, generating less dielectric loss. The associated attenuation curve can hereby become relatively different. Cat6 cable for example has a loss characteristic different from the one of Cat5 cable.

At the level of printed circuit boards, including the ones in FR4 (epoxy laminate), one typically has different loss mechanisms for different loss origins. Beside the skin-effect and dielectric losses, also a PCB-via generates losses, a wire bond generates losses, a connector generates losses, trace bends generate losses etc. . . . Equalizing a PCB transmission channel is therefore a more difficult task to fulfill.

Figure 15:
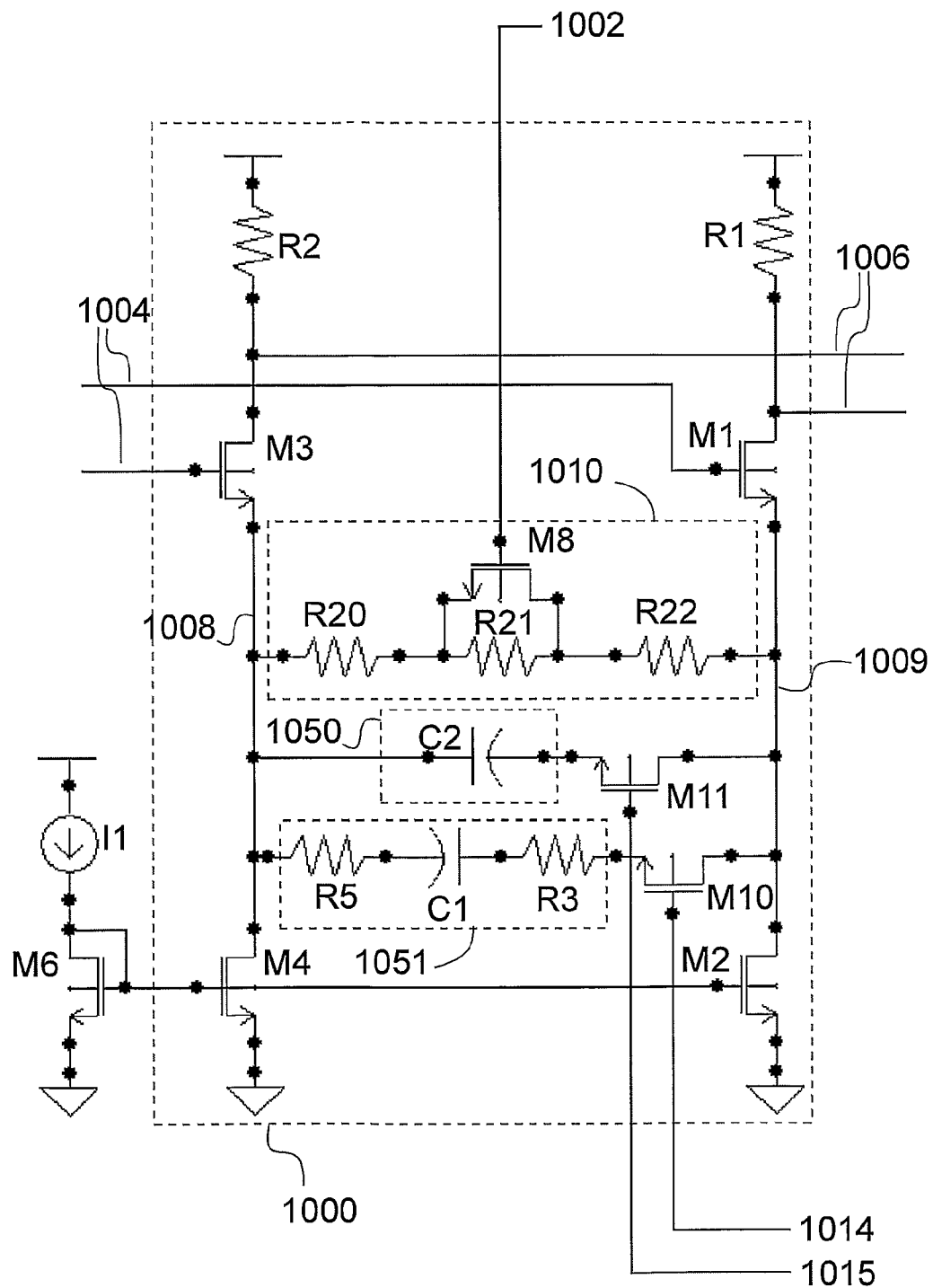
FIG. 15 shows an embodiment of an amplifying compensation stage with a first gain input terminal for low frequency regulation, a second input terminal for mid-frequency gain regulation and a third input terminal for higher frequency gain regulation, the mid- and higher frequency gain regulation being by nmos transistor switches driven by the signals at the second and third input terminals.
Figure 18:
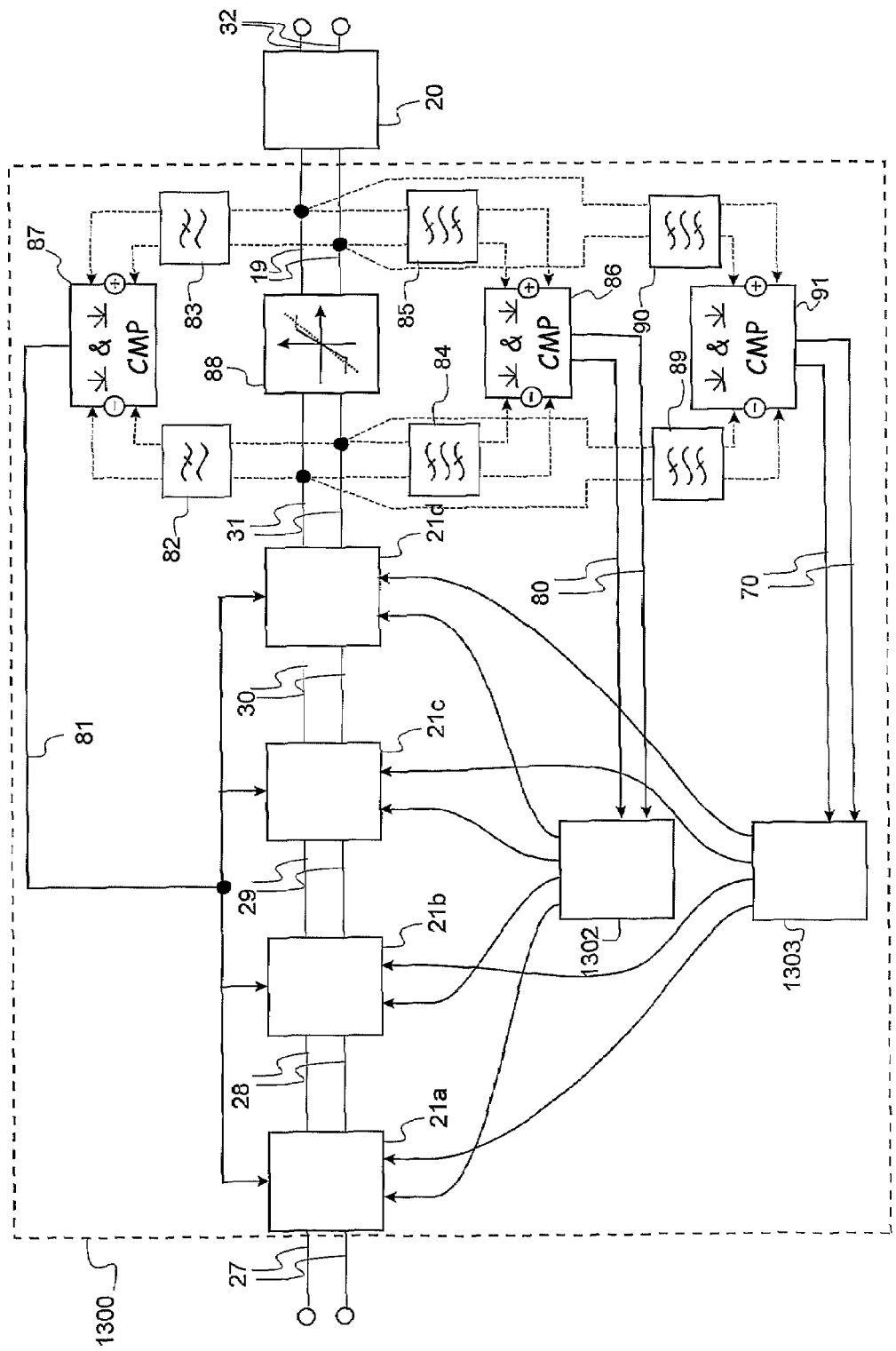
FIG. 18 shows a schematic representation of an adaptive equalizer having triple loop, which can be used with a comparator according to an embodiment of the present invention.

In order to compensate these sets of variable loss curves, a triple loop equalizer is provided, such as e.g. an implementation corresponding to the block schematic of FIG. 18, with triple loop amplification compensation stages such as stages 1000 illustrated in FIG. 15, for amplifying and compensating for distortions and incoming data signal on input node 1004, and outputting the amplified and compensated data signal on output node 1006, whereby three loops converge to a more or less optimal end-point whereby little jitter will be present in the final output eye-diagram. The triple loop equalizer comprises a plurality of comparators which, according to the present invention, are implemented as the comparators according to the present invention discussed hereinabove with regard to the dual loop equalizers.

FIG. 15 is a schematic representation of a triple-loop amplifying compensation stage 1000 that has three parameters to tune: the low frequency gain by a first control signal on a low frequency gain input 1002, for amplifying the signals in a frequency band up to $\frac{1}{15}$ of the upper data frequency, e.g. a frequency band up to 100 MHz; the mid-frequency gain by a second control signal on a mid-frequency gain input 1014, for amplifying signals in a frequency band between $\frac{1}{20}$ and $\frac{1}{2}$ of the upper data frequency, e.g. a frequency band between 100 MHz and 1 GHz, and the higher frequency gain by a third control signal on a higher frequency gain input 1015, for amplifying signals in a frequency band higher than $\frac{1}{5}$ of the upper data frequency, e.g. a frequency band above 400 MHz.

The first control signal on the low frequency gain input 1002 operates in an analogous way for the triple loop amplification compensation stage 1000 as the control signal on the first gain input terminal 802 for the amplifying compensation stage 800. The first control signal on the low frequency gain input 1002 regulates a controllable analog switch, e.g. transistor M8, that brings the total series resistance of lower frequency gain function circuit 1010 from a first value, e.g. (R20+R21+R22), when the switch is fully open, down to a second value, e.g. approximately (R20+R22), when the switch is fully closed.

This determines the gain at lower frequency of the triple loop equalizer stage 1000. The values of the resistive elements, e.g. resistors R20, R21 and R22, in the lower frequency gain function circuit 1010 may be chosen such that the gain at lower frequencies can be regulated in a range of between a first and a second value, e.g. −1.5 to +1.5 dB. Depending on the specific application needs this range may be chosen differently. It is also possible to leave out the resistors R20, R21 and R22, and directly connect the continuously varying analog switch, e.g. transistor M8, between nodes 1008 and 1009. As explained before with respect to a previous embodiment, this would cost less substrate area, e.g.

Si area, for the resistors, but it is at the expense of linearity and it lowers regulating stability and can give start-up difficulties under certain circumstances.

The amplifying compensation stage 1000 further has a programmable and/or tunable higher frequency gain function circuit 1050 comprising at least a capacitor C2. By turning on a switching element in series with the higher frequency gain function circuit 1050, e.g. transistor M11, the circuit elements grouped as gain function circuit 1050, becomes connected between the sources of transistor M1 and transistor M3, leading to higher frequency gain at the output node 1006. When the switching element, e.g. transistor M11, is not conducting, the higher frequency gain disappears.

The amplifying compensation stage 1000 further has a programmable and/or tunable mid-frequency gain function circuit 1051 comprising a series connection of at least one resistor, e.g. resistors R5 and R3, and at least one capacitor, e.g. capacitor C1. By turning on a switching element in series with the higher frequency gain function circuit 1051, e.g. transistor M10, the circuit elements grouped as gain function circuit 1051, become connected between the sources of transistor M1 and transistor M3, leading to mid-frequency gain at the output node 1006. When the switching element, e.g. transistor M10, is not conducting, the mid-frequency gain disappears.

Figure 16:
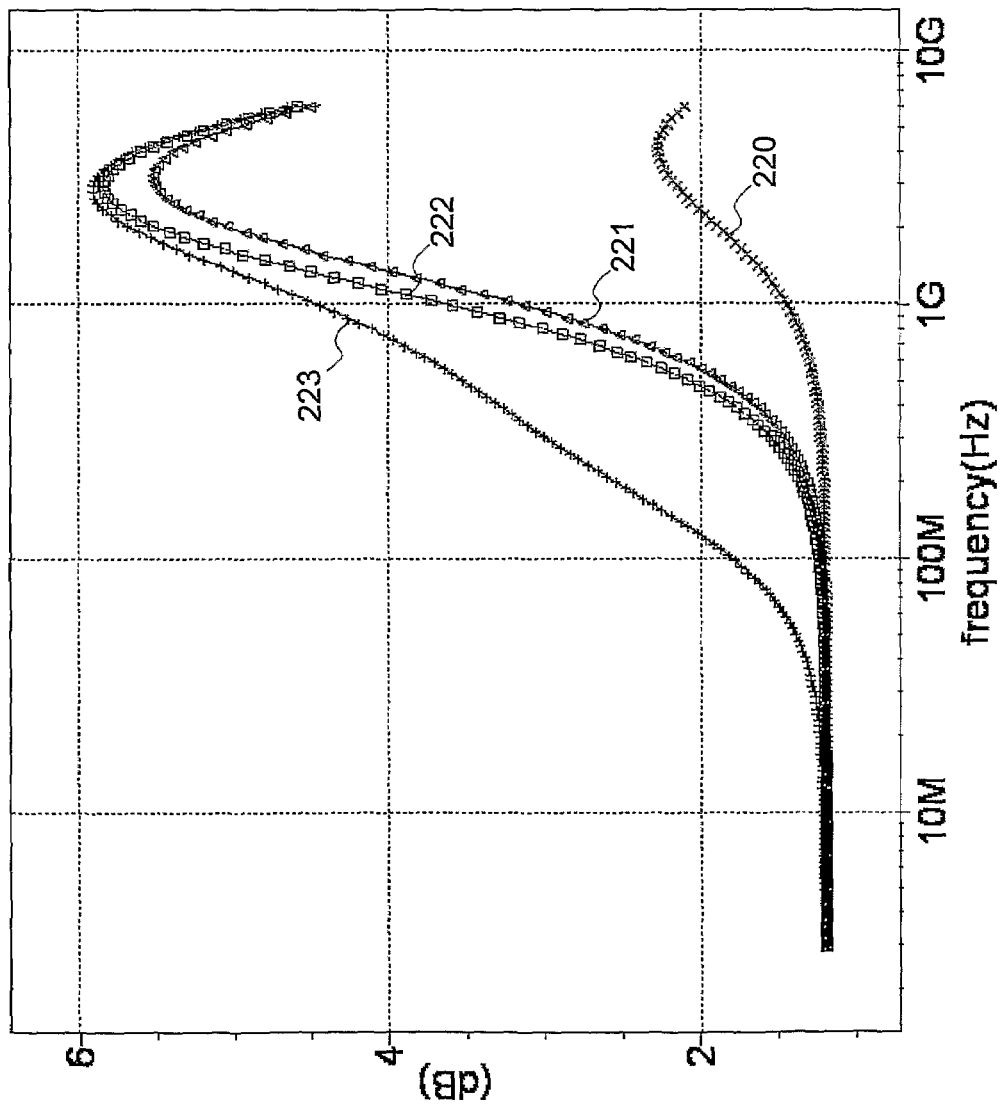
FIG. 16 shows several gain curves associated with amplifying compensation stages of FIG. 15 and FIG. 17.

Curve 220 in FIG. 16 is the gain curve of triple-loop amplifying compensation stage 1000 whereby the voltage at the gain input is 1.2V, and the second and third control signals at the mid-frequency gain input 1014 and at the higher frequency gain input 1015 respectively are both 0 V. In this way, branches corresponding to the programmable and/or tuneable higher frequency gain function circuit 1050 and corresponding to the programmable and/or tuneable mid frequency gain function circuit 1051 are not active. The curve shows a small rise in gain for frequencies >1 GHz, but this is not harming good equalizer operation. Curve 222, is when the higher frequency gain branch becomes active, by bringing the third control signal on the higher frequency gain input 1015 to a positive value, e.g. 1.8V, and making the switching element in that branch, transistor M11, conductive. The capacitor C2 brings in a zero letting the gain rise strongly from 300-400 MHz onwards, until 2.4 GHz, at the maximum bandwidth of the stage.

Turning on the switching element in the branch corresponding to the programmable and/or tuneable mid-frequency gain function circuit, in the example given transistor M10, (by bringing the second control signal at mid-frequency gain input terminal 1014 to a positive value, e.g. 1.8V), deforms the gain curve to curve 223. Curve 223 starts rising earlier, from 40 MHz onwards, but rises less steep, until curve 223 comes back together with curve 222 at 1.5 GHz. Such a less steep rise in gain curve is needed in cases whereby a transmission channel has to be compensated having not such a steep loss curve. The latter is typically the case when skin-effect is dominating the loss curve, or when many causes of losses are at much higher frequencies (e.g. 10 GHz), each giving a tiny bit of loss at the 1 GHz level. Such accumulated large number of small amounts of loss may also form a loss tail with a less steep loss behaviour. The very steep curve 222 on the contrary, may rather serve for compensating dielectric losses in transmission channels or first order filtering losses like a bond-wire or a lossy connector, with an attenuation pole in the GHz range.

Figure 17:
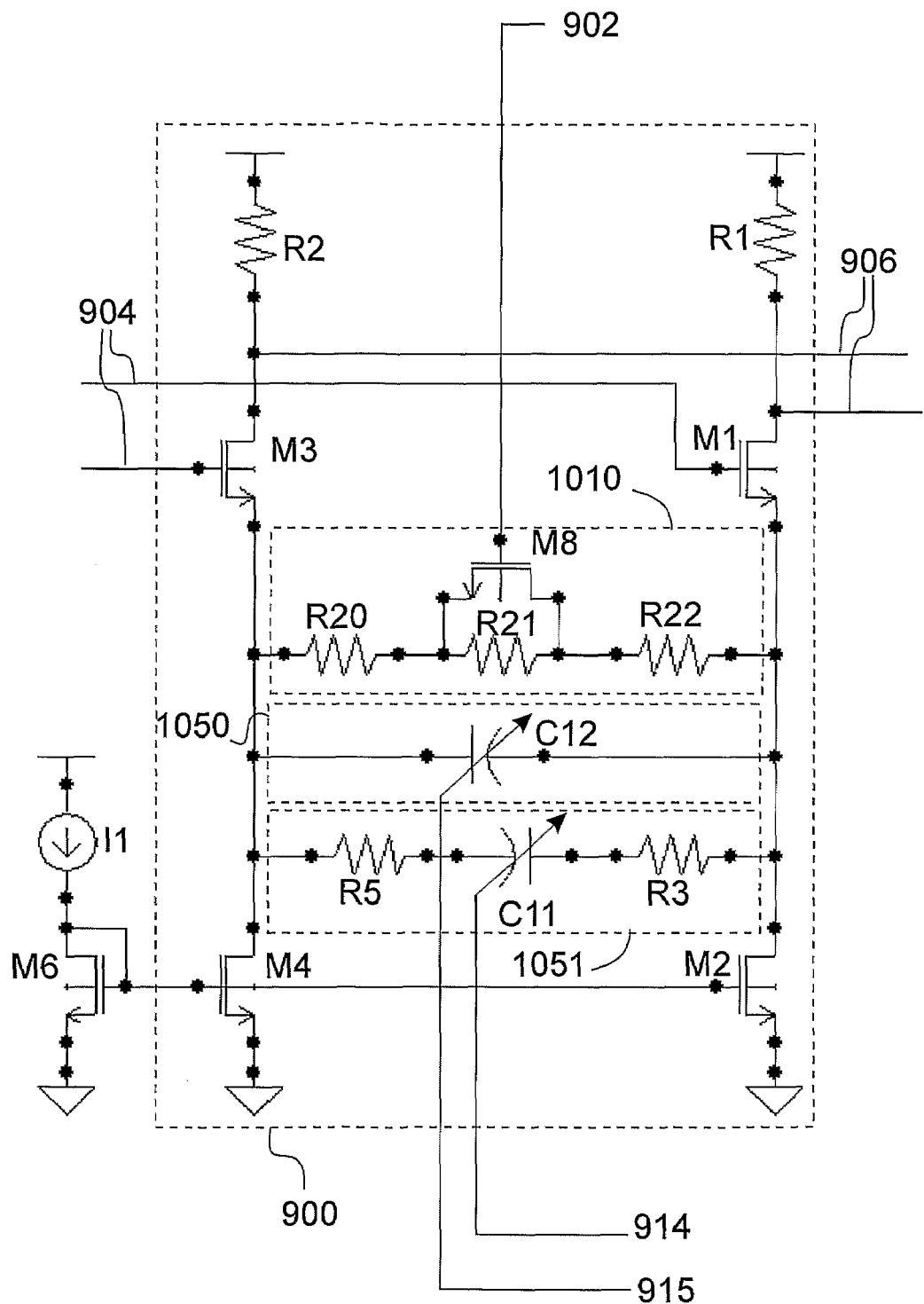
FIG. 17 shows an embodiment of an amplifying compensation stage with a first gain input for low frequency regulation, a second input terminal for mid-frequency gain regulation and a third input terminal for higher frequency gain regulation, the mid- and higher frequency gain regulation being by the use of varactors driven by the signals at the second and third input terminals.

FIG. 17 shows a similar amplifying compensation stage 900 with an input node 904 and an output node 906, which amplifying compensation stage 900 is based on varactors C12 and C11. The circuit 900 illustrated comprises a programmable and/or tuneable lower frequency gain function circuit 1010, by which the lower frequency gain can be adjusted via a first control signal on lower frequency gain input 902, a programmable and/or tuneable mid-frequency gain function circuit 1051, by which the mid-frequency gain can be adjusted via a second control signal on mid-frequency gain input 914, and a programmable and/or tuneable higher frequency gain function circuit 1050, by which the higher frequency gain can be adjusted via a third control signal on a higher frequency gain input 915. The higher frequency gain function circuit 1050 at least comprises a varactor C12, and the mid-frequency gain function circuit 1051 at least comprises a varactor C11. The varactors' limitations in dynamic range will make it difficult to fully switch off the mid- and higher frequency gain. When fully turned on, however, curve 223 can be reached as well (FIG. 16). Curve 222 is the curve with the mid-frequency turned off entirely (what is difficult to reach because C1 cannot be turned of completely). Curve 221 is whereby the value of the varactor C12 in the higher frequency gain function circuit 1050 is decreased from 50 to 40 fF, demonstrating the shift depending on the change of the capacitor's value.

From simulations it can be learned that one may end up with gain curves that do not have a shape that would be a valid compensation curve for a transmission channel. This may happen when in a stage the mid-frequency gain function circuit 1051 is turned ON, while the higher frequency gain function circuit 1050 is turned OFF. In order to avoid this situation, it is preferred to work for both sets of switches, the switches M10 for the mid-frequency gain function circuits 1051 and the switches M11 for the higher frequency gain function circuits 1050, with a mechanism for sequentially turning on the switches, starting from the first amplifying compensation stage, closest to the input of the receiver. Further, by giving mid-frequency gain function circuit 1051 a heavier weight, in realistic circumstances there will always be at least the same number of higher frequency gain circuits 1050 turned ON as there will be mid-frequency gain circuits 1051 turned ON. The latter is achieved in simulations by choosing the value of resistors R5 and R3 in the mid-frequency gain function circuit 1051 at 4 kΩ instead of 8 kΩ. The capacitor C1 in the mid-frequency gain function circuit 1051 may have a larger value accordingly, however, for the simulations C1 was held to its 140 fF value. The remaining components have the same values as in stage compensating 800 for generating similar results, transistors M11 and M10 having same W/L as transistor M9.

FIG. 18 is a schematic representation of a triple loop auto-adaptive equalizer 1300. For the higher frequency gain there are the band-pass filters 84 and 85, the rectifying comparator 86, and the sequential turn-on circuit 1302 for sequentially turning ON higher frequency gain function circuits of subsequent amplifying compensation stages 21a, 21b, 21c, 21d. For the mid-frequency gain there are the band-pass filters 89 and 90, the rectifying comparator 91, and the sequential turn-on circuit 1303 for sequentially turning ON mid-frequency gain function circuits of subsequent amplifying compensation stages 21a, 21b, 21c, 21d. A signal 80, respectively 70, communicates to sequential turn-on circuit 1302, respectively 1303, to increase or decrease the higher frequency gain, respectively the mid-frequency gain.

According to the present invention, the rectifying comparators 86, 87, 91 are implemented as described above with regard to the dual loop equalizers.

The input sides of the rectifying comparators 86, 87, 91, according to an embodiment of the present invention, are each connected to two transistors. The negative input side of a comparator 86, 87 91, has the gate of a first transistor and the gate of a second transistor as input terminals, and the positive input of a comparator 86, 87, 91 has the gate of a third transistor and the gate of a fourth transistor as input terminal.

Figure 9:
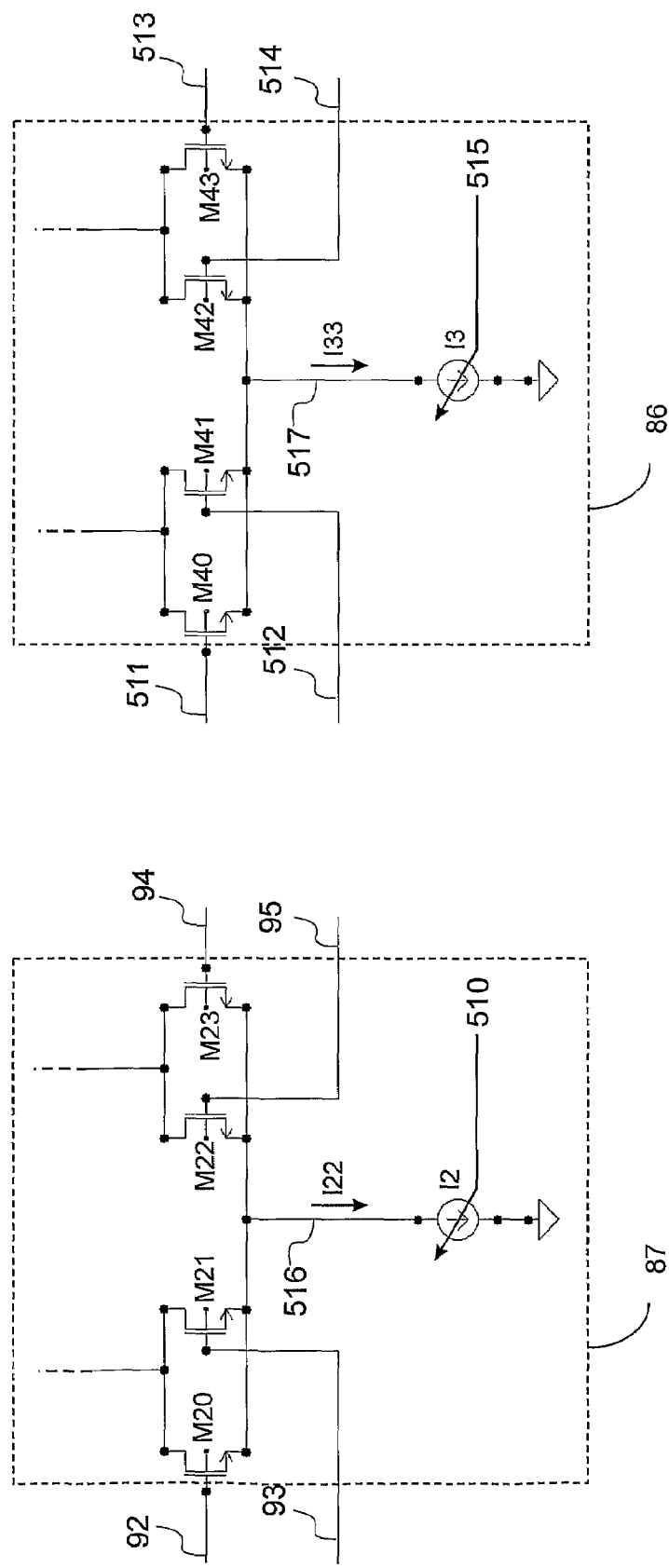
FIG. 9 shows part of the comparators as in FIGS. 6 and 7 according to a first embodiment of the present invention.

In one embodiment, and as illustrated in FIG. 9, the four input transistors have a common source that is driven by a current source. This way of comparing two differential signals is very fast, has little offset and is inherently rectifying, as the highest signal in voltage at the positive input side is taken for comparison with the highest signal in voltage at the negative input side. The offset is determined mainly by the matching between the transistors. The width W of these transistors should be taken as large as possible, for improving the matching of these transistors, with small length L for still being fastly responsive. As an example of a design these transistors may have W=20 um and L=180 nm.

The remainder of the comparators 86, 87, 91 may be like any other comparator and can be designed by a person skilled in the art.

According to the present invention, the loop detection mechanism is improved by adapting the current source so as to deliver a variable current, e.g. by modulating the bias current of the comparators 86, 87, 91.

Again, as explained with respect to double loop equalizers, different implementations are possible.

One of the possible implementations is fixed current sources in each of the comparators, and paralleling them with capacitive elements. This way, the currents delivered by the current sources get modulated in a way that serves the purpose of achieving increased comparator performance in the appropriate periods. These capacitors will deteriorate the high frequency common mode rejection of the respective comparator and will give preference to comparison of signals of high voltage, due to bias current that will increase automatically since the common source nodes are not able to follow quickly enough.

In other words, by using comparator structures having a bad high frequency common mode rejection is advantageous for the comparison in the given situation, since it will increase comparison performance during periods where the input voltage signals are highest, and where in the present case, also the difference signals are largest and most meaningful for the respective detector function.

In view of the analogy with the embodiments of the dual loop equalizers, further embodiments of triple loop equalizers are not described in more detail. It is, however, not intended to limit the triple loop equalizers just to the embodiment described hereinabove; other triple loop equalizers including corresponding circuits and features as described with regard to the double loop equalizers are considered part of the invention as well.

Like in the dual loop configuration it is advised, however not necessary for the present invention, to target to a small overcompensation (instead of to the optimal compensation), in this case for both the mid-frequencies and the higher frequencies. In any case one should avoid to ever give a few dB (or more) too little compensation, since this leads to severe jitter penalties. This overcompensation, if not generated automatically, can e.g. be provoked by including an offset in the corresponding comparator means, e.g. comparator 86 for the higher frequencies or comparator 91 for the mid frequencies.

An auto-adaptive equalizer specified for a pre-determined bit-rate and a maximum compensation level can, for a specified cable, compensate cable losses up to a pre-determined maximum cable length. The "auto-adaptive" specification means that the equalizer will automatically adapt its compensation level for shorter lengths than the maximum cable lengths. The better auto-adaptive cable equalizer will remain working correctly with lower bit-rates up to the same cable length. In that sense an equalizer according to embodiments of the present invention may be said to be a multi-rate equalizer. Alternatively, at the lower bit-rates extended reach may be provided, i.e. gain may be supported for longer cables than the maximum cable length at its maximum bit-rate. In general, equalizers can compensate a total loss of about 30 dB. For more loss compensation one typically runs into signal to noise ratio problems. The aim of a multi-rate equalizer according to the present invention can thus be to achieve this 30 dB compensation in a larger bit rate range.

Figure 19:
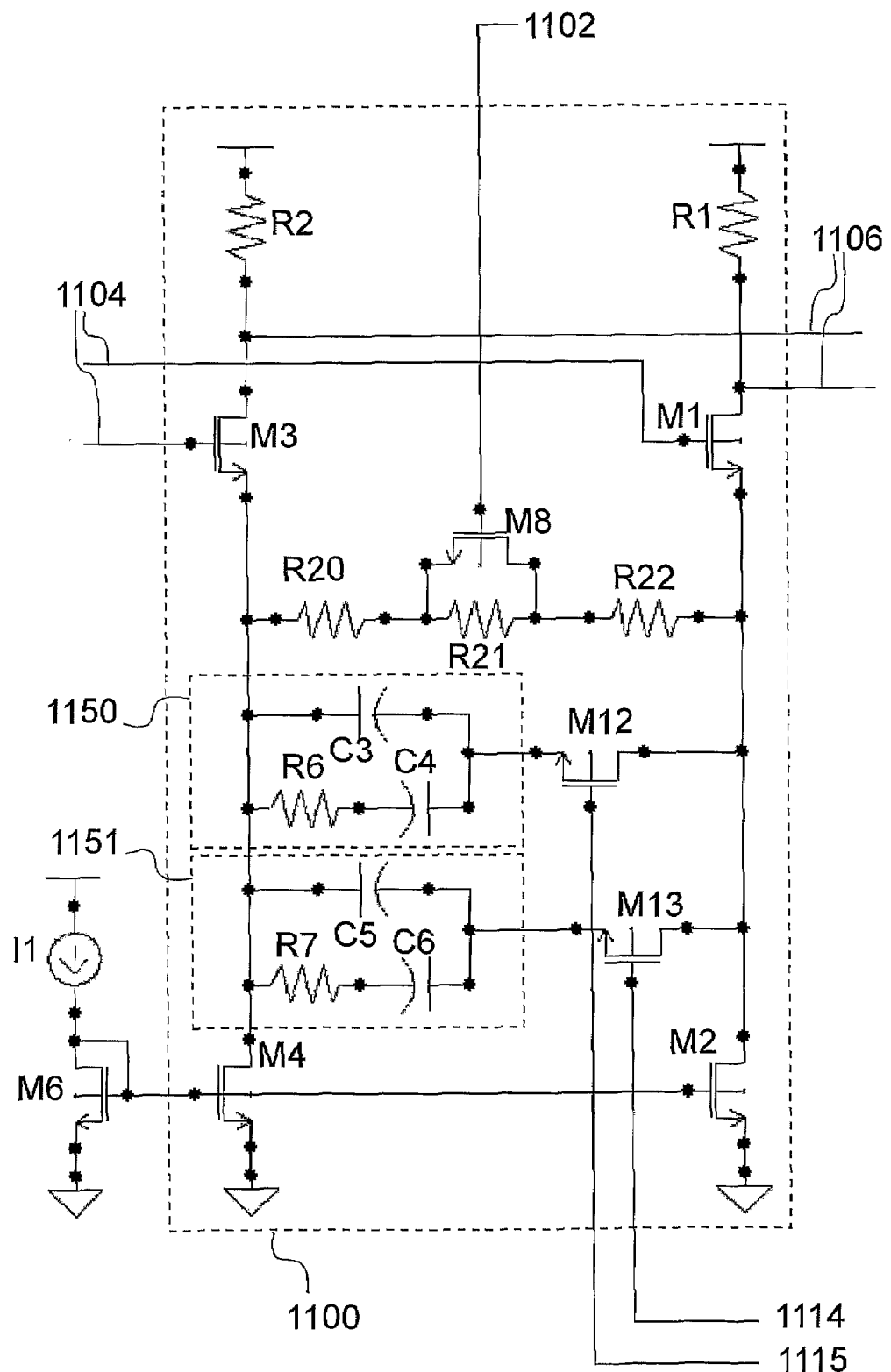
FIG. 19 shows an amplifying compensation stage that is adapted for multi-rate operation.

It will now be demonstrated how to achieve this for the bit rate range from 800 Mbps up to 4 Gbps using a somewhat modified triple loop approach. FIG. 19 shows the amplification compensation stage 1100 that is adapted for multi-rate operation. Like in some previous stages there is for compensation at the low frequencies, e.g. frequencies below 20 MHz a lower frequency gain input terminal 1102 onto which a first control signal can be put for controlling a lower frequency gain function circuit 1010. For the highest bit rate of 4 Gbps, compensation at the higher frequencies, e.g. frequencies between 100 MHz and 2.5 GHz may be done by a higher frequency gain function circuit 1150 that can be turned ON by a suitable control signal on the higher frequency gain input terminal 1115 and its associated switch, e.g. transistor M12. For the lower speeds, i.e. lower frequencies, a switch, e.g. transistor M13, controlled by a suitable control signal on mid-frequency gain input terminal 1114, can turn ON mid-frequency gain function circuit 1151, thus turning on additional gain at the middle frequencies, i.e. frequencies between 10 MHz and 1 GHz such that the bit-rates from 800 Mbps upto 4 Gbps may reach compensation up to at least +30 dB. Again, although not shown, a person skilled in the art can design, following an embodiment of the present invention, a multi-rate stage based on varactors.

The components of the higher frequency gain function circuit 1150, for the embodiment illustrated capacitors C3 and C4 and resistor R6, can be determined in the same way as in the dual loop stage 800 capacitors C1, C2, and resistors R5 and R3 were determined, using a target gain curve derived from a loss measurement from the target cable. When calculating the same values C3=100 fF, C4=140 fF and R6 equaling 16 kΩ are obtained. R6 equals the series connection of R3 and R5. In a similar way the components of the mid-frequency gain function circuit 1151, in the embodiment illustrated capacitors C5 and C6 and resistor R7, can be derived. Since it is the intention to operate well at 800 Mbps, a loss curve can be measured, a target gain curve made, and a curve with all mid-frequency gain function circuits 1151 turned ON can be fit onto it. Hereby, the following has to be taken into account: when working at lower bit-rates, all higher frequency gain stages will typically be turned ON by their higher frequency gain loop. This loop will always try to increase the higher frequencies in order to match the higher frequencies that are present at the output of the limiting amplifier 88. However this loop will go out of its regulation range, turning all higher frequency gain inputs ON. This does not form a problem when this is taken into consideration when fitting the values of the components C5, C6 and R7 of the mid-frequency gain function circuit. It also avoids that there may be a stage that has only its mid-frequency gain terminal turned ON, without having its higher frequency terminal being ON, giving unwanted curvatures. For this triple loop example a lowpass filter with −3 dB point at 10 MHz, a mid frequency pass band filter with maximum gain point at 100 MHz, and a higher frequency pass band filter with maximum gain at 750 MHz gives good triple convergence. In an alternative embodiment, for the higher frequency gain instead of pass-band filters high-pass filters may be used having the advantage that the signal at the inputs of comparator 86 may have a larger amplitude, facilitating comparison. When operating at high speeds, however, it should not be neglected that a mere high pass filter represents heavier loading at the node to which it is connected It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. An equalizer filter for compensating a received distorted signal for frequency dependent signal modifications introduced by a transmission channel, the received signal having an amplitude, said filter comprising
    at least one amplifying compensation stage having a gain and a saturation level,
    at least one limiting amplifier,
    gain control means for controlling the gain of the at least one amplifying compensation stage, the gain control means comprising a plurality of comparator circuits comparing filtered input and output signals of the limiting amplifier, the plurality of comparator circuits comprising a bias current source,
    wherein the bias current source is adapted to deliver a variable current and the bias current is increased during periods when voltage levels of signals to be compared are the highest.

2. An equalizer filter according to claim 1, wherein the adaptation to the bias current source includes providing a current source delivering a current so low that the high frequency common mode rejection is deteriorated.

3. An equalizer filter according to claim 1, the gain control means comprising at least two comparator circuits comparing filtered input and output signals of the limiting amplifier, the at least two comparator circuits comprising a common bias current source.

4. An equalizer filter according to claim 1, wherein the adaptation to the current source is so as to provide a higher current level when differences between filtered input and output signals of the limiting amplifier are maximal.

5. An equalizer filter according to claim 1, wherein the gain of the at least one amplifying compensation stage is monotonically rising over at least a last decade in frequency below an upper data frequency of the received signal, the upper data frequency being at least half the data bandwidth or communication bit rate.

6. An equalizer filter according to claim 1, wherein the gain control means is adapted for controlling the gain of the amplifying compensation stage, such that the amplitude of the received signal amplified in the at least one amplifying compensation stage remains below the saturation level of the amplifying compensation stage.

7. An equalizer filter according to claim 1, wherein the equalizer filter is a dual loop equalizer filter.

8. An equalizer filter according to claim 1, wherein the equalizer filter is a triple loop equalizer filter.

9. An equalizer system for compensating a received distorted signal for frequency dependent signal modifications introduced by a transmission channel, said equalizer system comprising an equalizer filter according to claim 1.

10. An equalizer filter according to claim 1, wherein the plurality of comparator circuits comprise two differential inputs.

11. An equalizer filter according to claim 10, each differential input comprising two input nodes, wherein the comparator circuit is adapted to compare, from each differential input, signals on those input nodes which are highest in voltage.

12. An equalizer filter according to claim 11, wherein each input node of a differential input is connected to a gate of a transistor element.

13. An equalizer filter according to claim 1, wherein the adaptation to the current source includes the current source being provided with modulation means for modulating a current delivered by the bias current source.

14. An equalizer filter according to claim 13, wherein the modulation means for modulating the current delivered by the bias current source comprises a capacitive element placed in parallel over a fixed bias current source.

15. An equalizer filter according to claim 13, wherein the modulation means for modulating the current delivered by the bias current source comprises a modulation signal for modulating a variable current source.

16. A method for compensating a distorted signal for frequency dependent signal modifications introduced by a transmission channel, the signal having an amplitude, the method comprising
receiving a distorted signal,
compensating said distorted signal
outputting a compensated signal at an output node of an equalizer filter, wherein the step of compensating comprises
providing a gain,
amplifying the received signal in at least one amplifying compensation stage using the provided gain,
comparing differential outputs of a first signal on an output node of the last amplifying compensation stage and of a second signal on the output node of the equalizer filter, the comparing being adapted so that comparison performance is increased during periods when voltage levels of signals to be compared are the highest by increasing bias current of a comparator circuit.

17. A method according to claim 16, comprising before comparing the differential outputs, filtering the first signal on the output node of the last amplifying compensation stage and the second signal on the output node of the equalizer filter.

18. A method according to claim 16, furthermore comprising amplifying and/or saturating the output of the last amplifying compensation stage.

19. A method according to claim 16, furthermore comprising generating a comparison signal and using this comparison signal in adjusting at least one of the higher frequency gain, the mid-frequency gain or the low frequency gain of the at least one amplifying compensation stages.

20. A method according to any of claim 16, wherein the provided gain is monotonically rising over at least a last decade in frequency below an upper data frequency of the received distorted signal, the upper data frequency being at least half the data bandwidth or communication bit rate.

21. A method according to claim 16, wherein the gain is adapted so as to keep the amplitude of the signal below a saturation level of at least one amplifying compensation stage.

* * * * *